United States Patent
Sawant et al.

(10) Patent No.: US 11,918,941 B2
(45) Date of Patent: Mar. 5, 2024

(54) INTEGRATED MODULE WITH STAGE ONE AND STAGE TWO FILTERS COMBINED IN SINGLE HOUSING

(71) Applicant: CUMMINS FILTRATION IP, INC., Columbus, IN (US)

(72) Inventors: Anil I. Sawant, Pune (IN); Vijaykumar Mahadev Burande, Pune (IN); Benjamin L. Scheckel, Stoughton, WI (US); Barry Mark Verdegan, Stoughton, WI (US); Miao Li, McFarland, WI (US); Billy M. Bates, Cookeville, TN (US); Mark T. Wieczorek, Cookeville, TN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 17/888,179

(22) Filed: Aug. 15, 2022

(65) Prior Publication Data
US 2022/0387913 A1    Dec. 8, 2022

Related U.S. Application Data

(63) Continuation of application No. 16/758,496, filed as application No. PCT/US2018/057764 on Oct. 26, 2018, now Pat. No. 11,458,426.

(30) Foreign Application Priority Data

Oct. 27, 2017    (IN) .............................. 201741038145

(51) Int. Cl.
*B01D 36/00*    (2006.01)
*F02M 37/24*    (2019.01)
(Continued)

(52) U.S. Cl.
CPC ............ *B01D 36/003* (2013.01); *F02M 37/24* (2019.01); *B01D 29/58* (2013.01); *B01D 35/30* (2013.01);
(Continued)

(58) Field of Classification Search
CPC ...... B01D 36/003; B01D 29/58; B01D 35/30; B01D 2201/0415; B01D 2201/295;
(Continued)

(56) References Cited

U.S. PATENT DOCUMENTS 2,098,725 A * 11/1937 Hurn .................... B01D 35/147
                                                                  210/167.04
3,144,407 A *  8/1964 Olmos ................... B01D 17/10
                                                                  210/DIG. 5
(Continued)

FOREIGN PATENT DOCUMENTS

CN         103599661      2/2014
CN         105492097      4/2016
(Continued)

OTHER PUBLICATIONS

First Office Action issue for Chinese Patent Application No. 201880068383.2 dated May 31, 2021, 13 pages.
(Continued)

*Primary Examiner* — Waqaas Ali
(74) *Attorney, Agent, or Firm* — Foley & Lardner LLP

(57) ABSTRACT

A filter assembly includes a filter housing having a longitudinal axis, the filter housing divided into a first filter chamber and a second filter chamber, a first element bottom endplate, a second element top endplate, an intermediate endplate positioned along the longitudinal axis between the second element top endplate and the first element bottom endplate, a first filter element housed within the first filter chamber and comprising first filter media positioned
(Continued)

between the first element bottom endplate and the intermediate endplate, and a second filter element housed within the second filter chamber and comprising second filter media positioned between the second element top endplate and the intermediate endplate.

20 Claims, 33 Drawing Sheets

(51) Int. Cl.
*B01D 29/58* (2006.01)
*B01D 35/30* (2006.01)

(52) U.S. Cl.
CPC ............... *B01D 2201/0415* (2013.01); *B01D 2201/295* (2013.01); *B01D 2201/347* (2013.01)

(58) Field of Classification Search
CPC .......... B01D 2201/347; B01D 2201/12; B01D 2201/125; B01D 2201/305; B01D 29/21; B01D 29/055; B01D 29/05; F02M 37/24; F02M 37/28; F02M 37/34; F02M 37/44; F02M 37/48
See application file for complete search history.

(56) References Cited

U.S. PATENT DOCUMENTS

| | | |
|---|---|---|
| 3,312,350 A | 4/1967 | Kasten |
| 4,502,956 A * | 3/1985 | Wilson ................ B01D 17/045 |
| | | 210/248 |
| 5,766,468 A | 6/1998 | Brown et al. |
| 6,328,883 B1 | 12/2001 | Jensen |
| 6,391,193 B1 | 5/2002 | Luka |
| 7,527,730 B2 | 5/2009 | Johannsson et al. |
| 10,695,701 B2 | 6/2020 | Kiedaisch et al. |
| 2008/0135469 A1 | 6/2008 | Fremont et al. |
| 2008/0179263 A1 | 7/2008 | Wieczorek et al. |
| 2009/0211959 A1 | 8/2009 | Clint et al. |
| 2009/0308803 A1 | 12/2009 | Beard et al. |
| 2010/0170208 A1 | 7/2010 | Matula et al. |
| 2016/0265496 A1 | 9/2016 | Baumann et al. |
| 2017/0106317 A1* | 4/2017 | Stamey, Jr. .......... B01D 35/005 |
| 2021/0180550 A1 | 6/2021 | Gerrit-Tobias |

FOREIGN PATENT DOCUMENTS

| | | |
|---|---|---|
| DE | 10 2012 108 464 | 6/2013 |
| JP | 2000-140524 | 5/2000 |
| KR | 101366876 | 2/2014 |
| WO | WO-2017/066169 A1 | 4/2017 |

OTHER PUBLICATIONS

First Office Action issued for Indian Patent Application No. 202047011595, dated Oct. 9, 2020, 6 pages.
Foreign Action other than Search Report on CN 201880068383.2 dated Mar. 3, 2022.
International Search Report and Written Opinion issued for PCT-US2018-057764, dated Jan. 11, 2019, 10 pages.

* cited by examiner

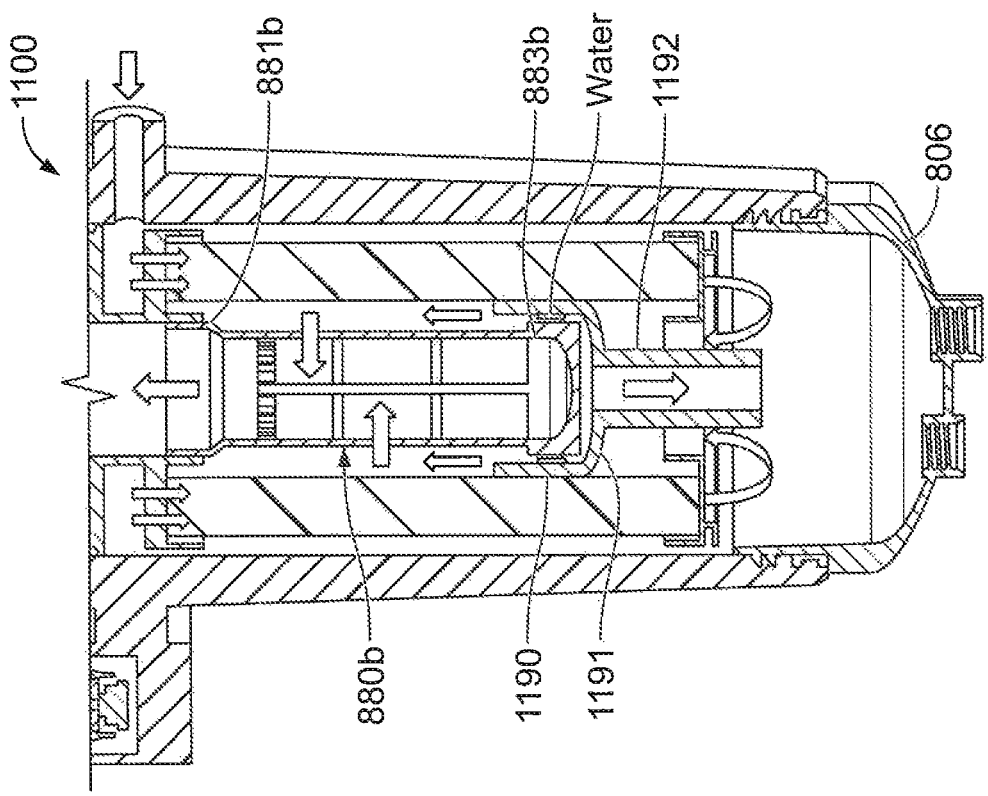
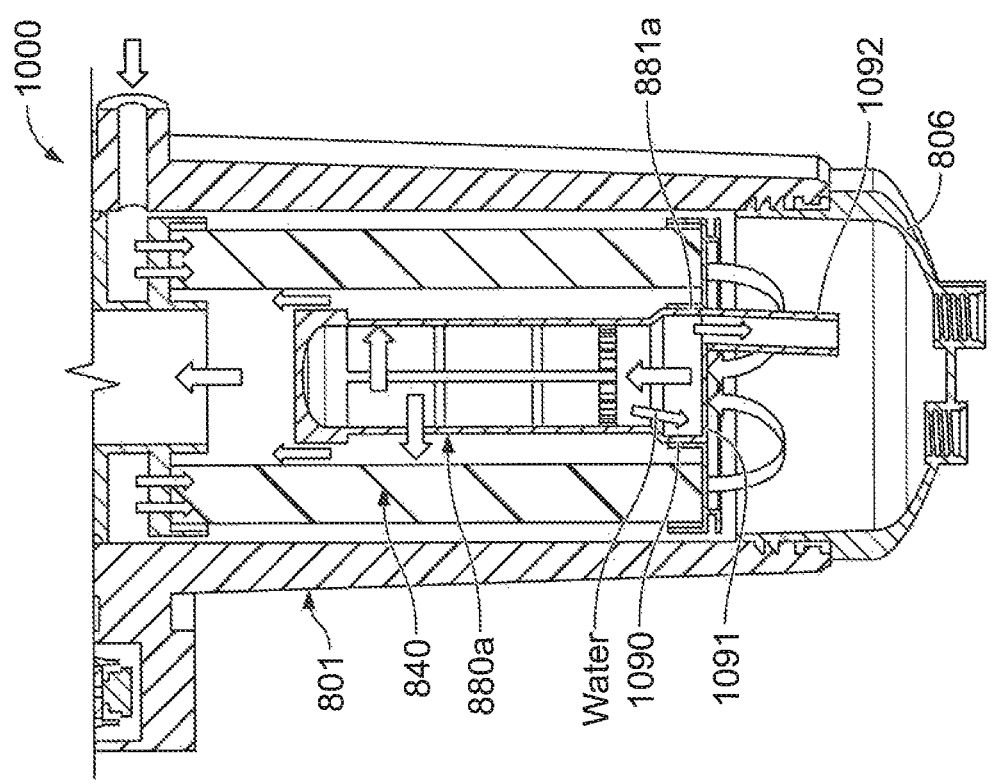

INTEGRATED MODULE WITH STAGE ONE AND STAGE TWO FILTERS COMBINED IN SINGLE HOUSING

CROSS-REFERENCE TO RELATED APPLICATIONS

The application is a continuation of U.S. patent application Ser. No. 16/758,496, filed Apr. 23, 2020, which claimed the benefit of PCT Application No. PCT/US2018/057764, filed Oct. 26, 2018, and which present disclosure claims priority to and benefit of Indian Provisional Application No. 201741038145, filed Oct. 27, 2017 and entitled "Integrated Module with Stage One and Stage Two Filters Combined in Single Housing," the disclosure of which is hereby incorporated herein by reference in its entirety.

TECHNICAL FIELD

The present disclosure relates generally to filtration systems for use with internal combustion engine systems or like.

BACKGROUND

Internal combustion engines generally combust a mixture of fuel (e.g., gasoline, diesel, natural gas, etc.) and air. Fluids passing through the internal combustion engine are filtered to remove particulate and contaminants from the fluids prior to entering the internal combustion engine and/or from fluids exiting the internal combustion engine. For example, prior to entering the engine, fuel to be combusted is typically passed through a filter element to remove contaminants (e.g., particulates, dust, water, etc.) from the fuel prior to delivery to the engine. The filter media of the filter element captures and removes particulate from the fuel passing through the filter media.

SUMMARY

Various example embodiments relate to a filter assembly including a filter housing having a longitudinal axis, the filter housing divided into a first filter chamber and a second filter chamber, a top endplate, a bottom endplate, an intermediate endplate positioned along the longitudinal axis between the top endplate and the bottom endplate. A first filter element is housed within the first filter chamber and comprises a first filter media positioned between the bottom endplate and the intermediate endplate. A second filter element is housed within the second filter chamber and comprises a second filter media positioned between the top endplate and the intermediate endplate.

Other example embodiments relate to a filter insert comprising a top endplate, a bottom endplate, an intermediate endplate positioned along a longitudinal axis between the top endplate and the bottom endplate. A first filter element comprises a first filter media positioned between the bottom endplate and the intermediate endplate. A second filter element comprises a second filter media positioned between the top endplate and the intermediate endplate.

These and other features, together with the organization and manner of operation thereof, will become apparent from the following detailed description when taken in conjunction with the accompanying drawings, wherein like elements have like numerals throughout the several drawings described below. It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE FIGURES

FIG. 36 is a side cross-section view of a portion of a filter assembly, according to an embodiment.

FIG. 37 is a side cross-section view of a portion of a filter assembly, according to another embodiment.

Figure 1:
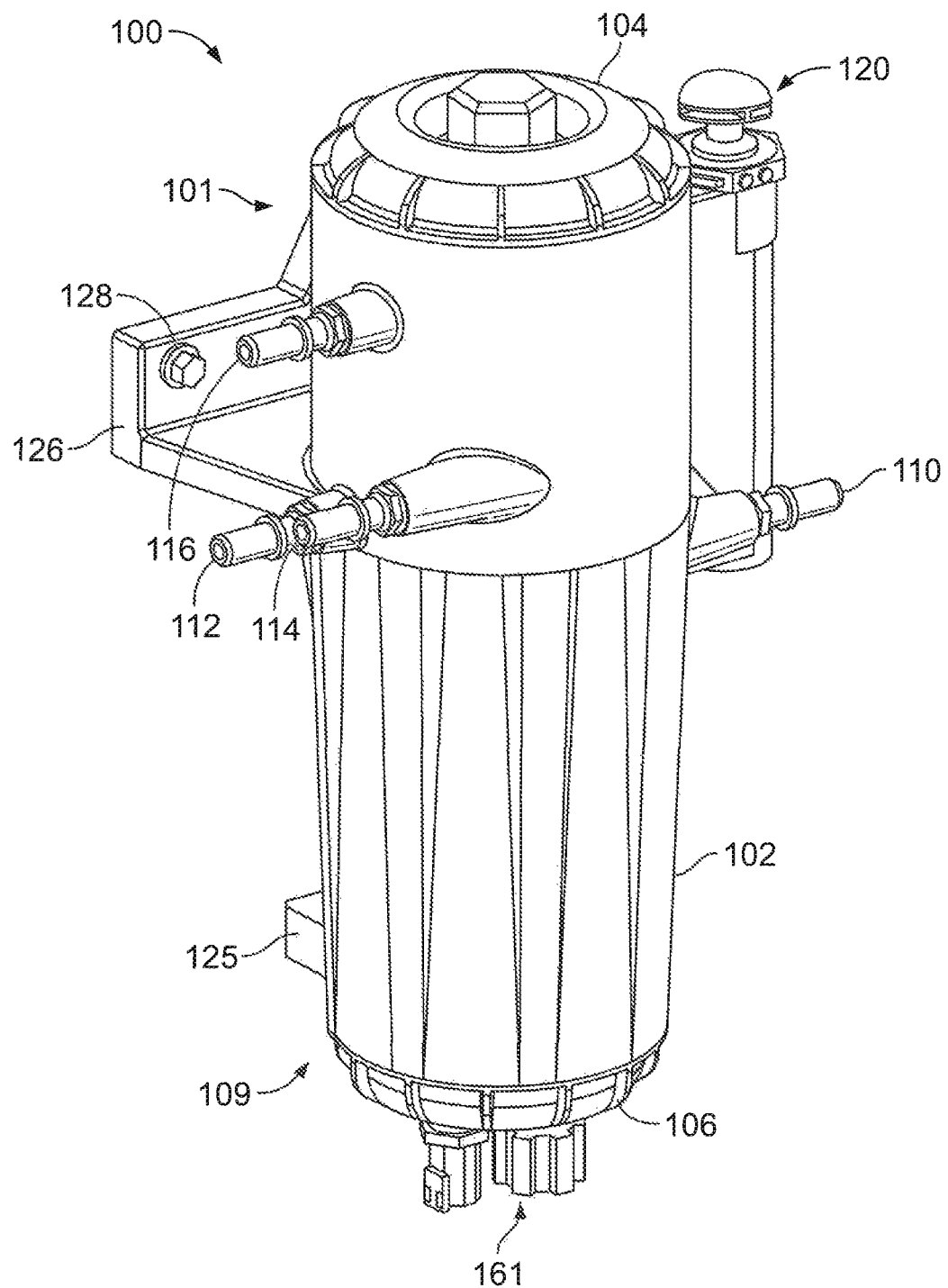
FIG. 1 shows a perspective view of a filter assembly according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Referring to the figures generally, a filter assembly configured to filter fluid prior to entering into an engine is shown. The filter assembly includes two "stages" of filter elements (referred to herein as stage one and stage two filter elements) integrated into a single combined filter insert installed and used within a single filter housing. Fluid entering the filter housing is first filtered by the stage one media, and is subsequently filtered by the stage two media. Integrating both stage one and stage two filter elements into a single combined filter insert installed within a single filter housing may provide a filter assembly which can fit in limited spaces on an engine without losing filter media area and may facilitate replacement and servicing of used filter elements. In some arrangements, more than two stages of filtration (e.g., five stages of filtration (or more)) can be provided within a single filter housing using a single combined filter insert. In some embodiments, the filter assembly may include an air/oil separator for filtering fluid exiting the internal combustion engine. In some embodiments, the stage one and stage two filter elements may filter different fluids; for example, the stage one filter element may filter lubricating oil and the stage two filter element may filter diesel fuel.

Referring to FIGS. 1-12, a filter assembly is shown according to an example embodiment. The filter assembly 100 filters fluid prior to use in an internal combustion engine. In another embodiment, the filter assembly 100 filters fluid exiting an internal combustion engine. The filter assembly 100 includes a filter housing 101 having an internal cavity 105, a first filter element 140, and a second filter element 150. The filter housing 101 includes a main housing portion 102, a cover 104, and a reservoir 106. The cover 104 and reservoir 106 can be screwed into the main housing portion 102 to form the internal cavity 105 of the filter housing 101. In other embodiments, the cover 104 and reservoir 106 can be fastened to the main housing portion 102 using other types of fasteners. The filter assembly 100 can be mounted onto an engine using the mounting plate 126 and fasteners 128 positioned near a back side 103 of the filter housing 101, as well as a mounting location 125 supported by mounting bracket 127 near a bottom side 109 of the filter housing 101.

Figure 3:
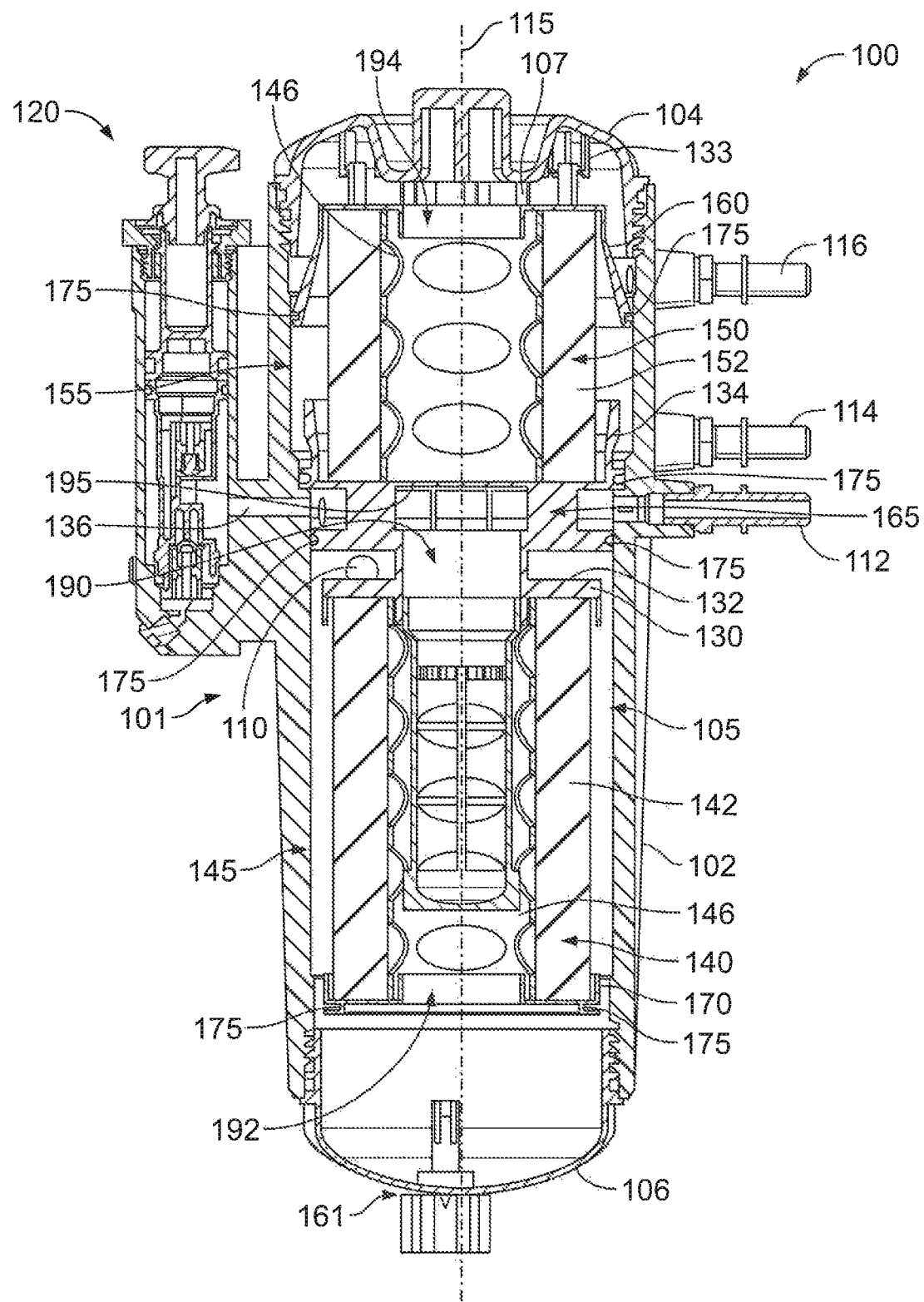
FIG. 3 shows a cross-sectional view of the filter assembly of FIG. 1.
Figure 4:
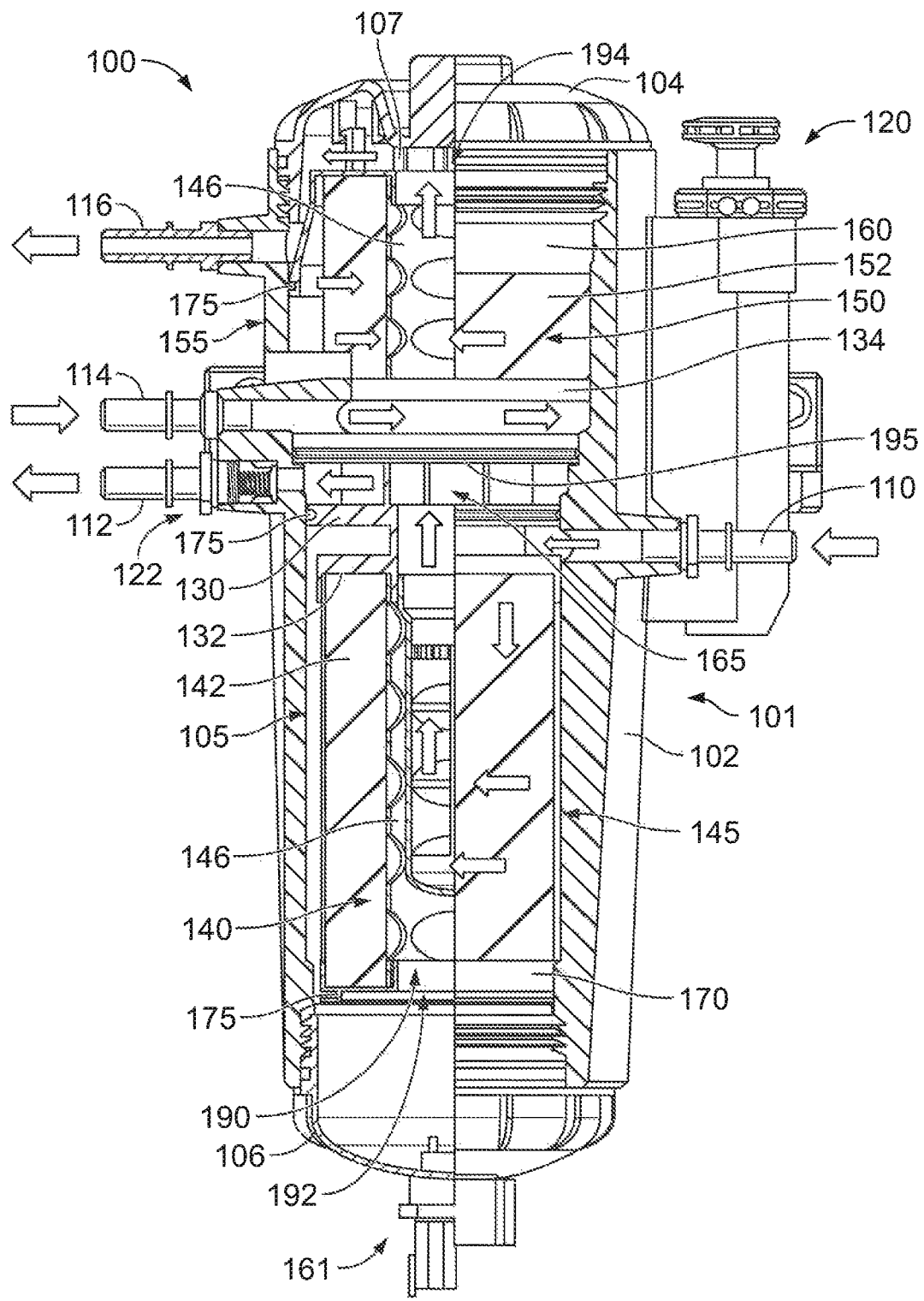
FIG. 4 shows a cross-sectional view of the filter assembly of FIG. 1.
Figure 9:
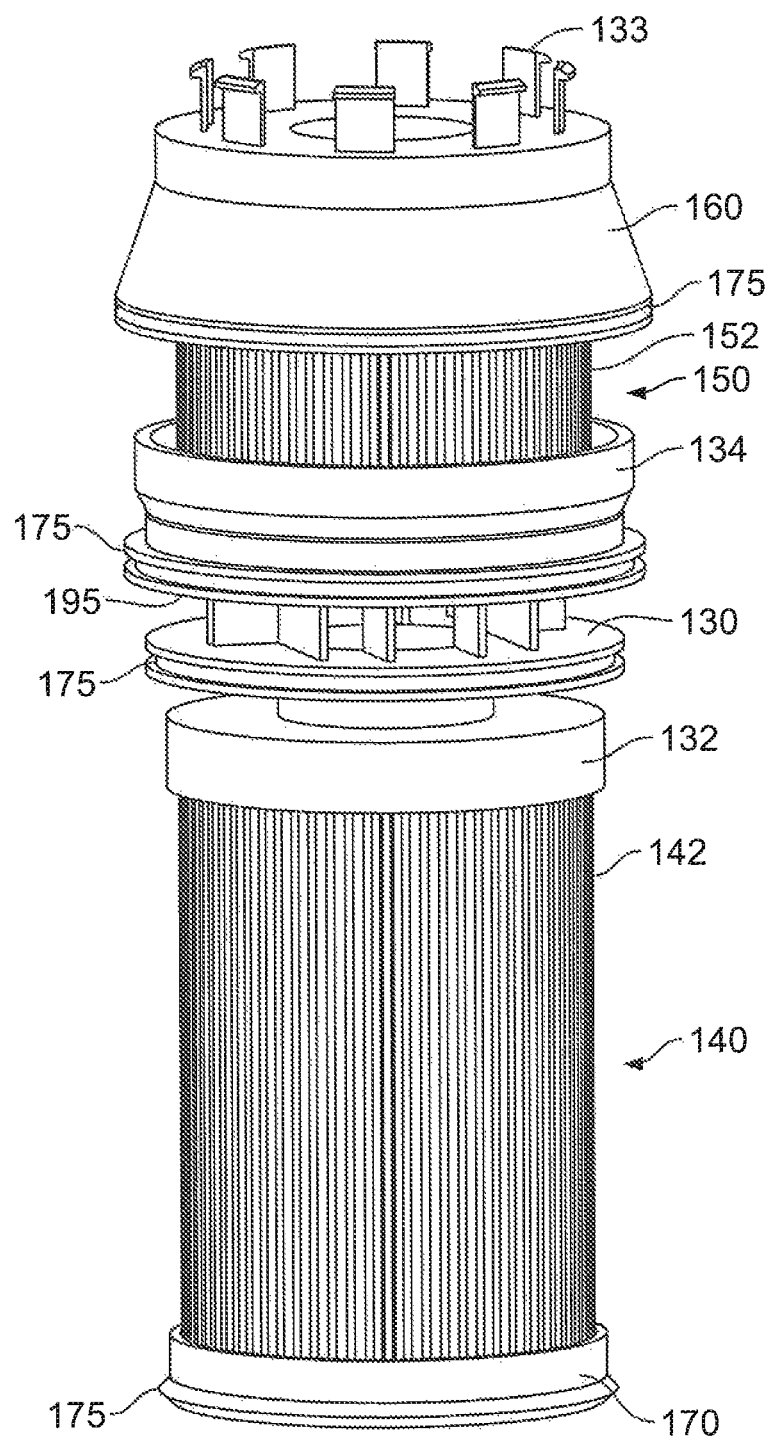
FIG. 9 shows a perspective view of a filter element of the filter assembly of FIG. 1.
Figure 10:
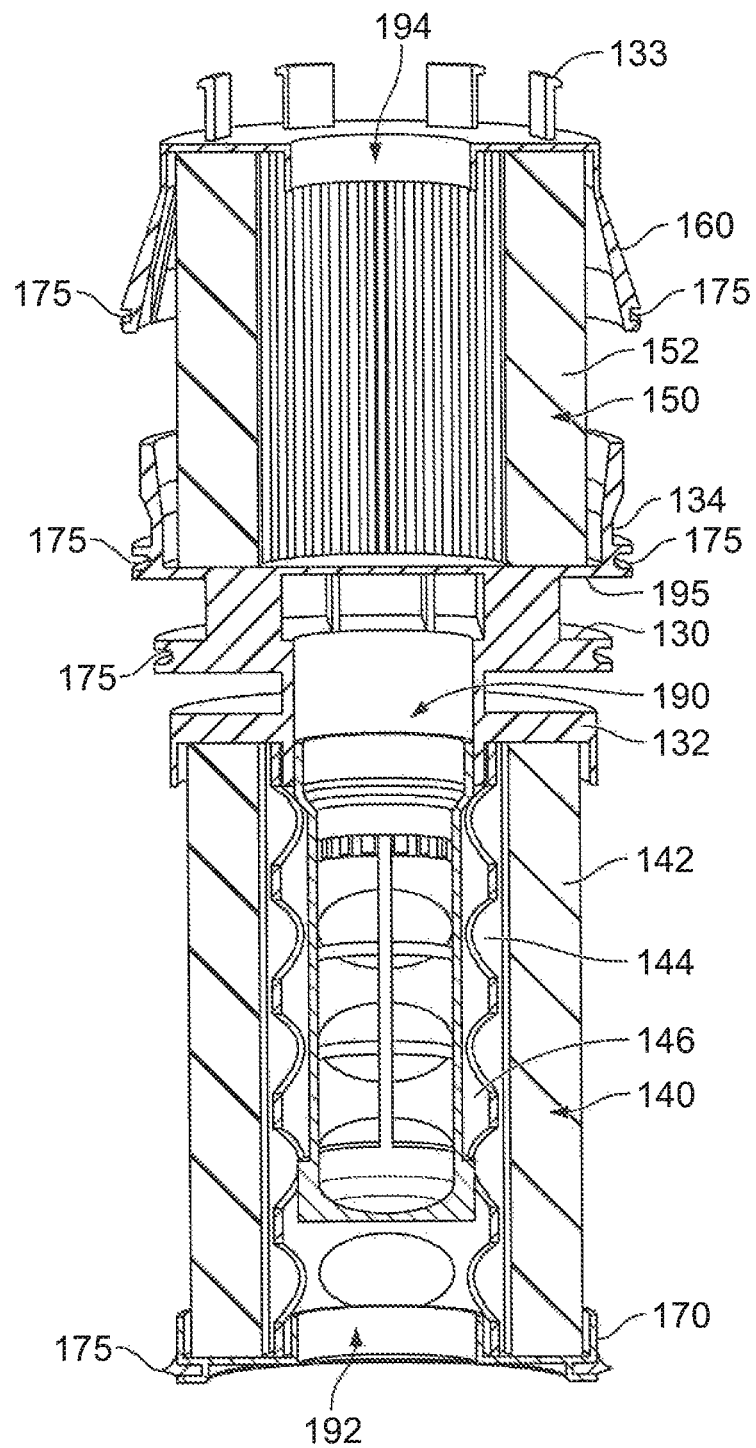
FIG. 10 shows a cross-sectional view of the filter element of FIG. 9 according to an example embodiment.
Figure 11:
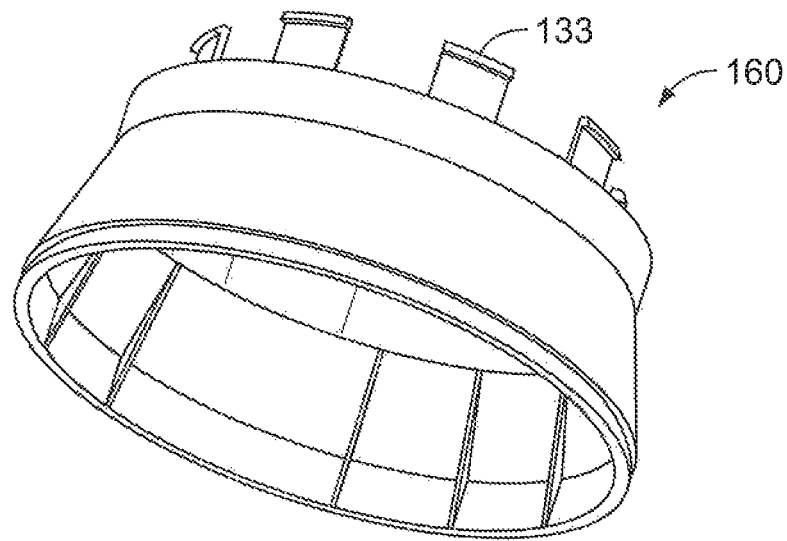
FIG. 11 shows a perspective view of a second element top endplate of the filter assembly of FIG. 1.

As shown in FIGS. 3-4, the first filter element 140 and the second filter element 150 are positioned within the internal cavity 105 of the filter housing 101. The first and second filter elements 140, 150 are cylindrical filter elements. The first filter element 140 and the second filter element 150 are positioned one above the other (e.g., axially stacked) along the longitudinal axis 115 of the filter housing 101. The first filter element 140 and the second filter element 150 are part of a single combined filter insert (as shown in FIGS. 9-10) configured to be inserted into the filter housing 101 as a single piece during assembly. In other embodiments, the first filter element 140 and the second filter element 150 are otherwise assembled (e.g., separately assembled) into the filter housing 101. The first filter element 140 can comprise a three layer media configuration. The second filter element 150 can comprise a two layer media configuration. Other media configurations of the first filter element 140 and the second filter element 150 can be provided. In some embodiments, the first filter element 140 and/or the second filter element 150 comprise a hydrophobic screen configuration configured to repel certain types of fluids (e.g., water).

The first filter element 140 includes first filter media 142 configured to filter a fluid. The first filter media 142 can include various types of filtration media, as described further herein. The first filter element 140 can also include a coalescing media 144. The coalescing media 144 separates water from the fluid flowing through the first filter element 140. Separated water coalesces and drops into the reservoir 106, which includes a drain outlet 161 for removing separated water from the filter assembly 100. In another embodiment, the coalescing media 144 is configured to remove oil droplets from engine blowby gases. In other embodiments, the first filter element 140 comprises a particulate filter for removing particulates from a fluid stream. A center tube 146 is positioned within the center of the first filter media 142. The center tube 146 is configured to support the first filter media 142 and to allow fluid flow through the first filter media 142. The center tube 146 may be formed from plastic, metals or any other suitable material.

Figure 6:
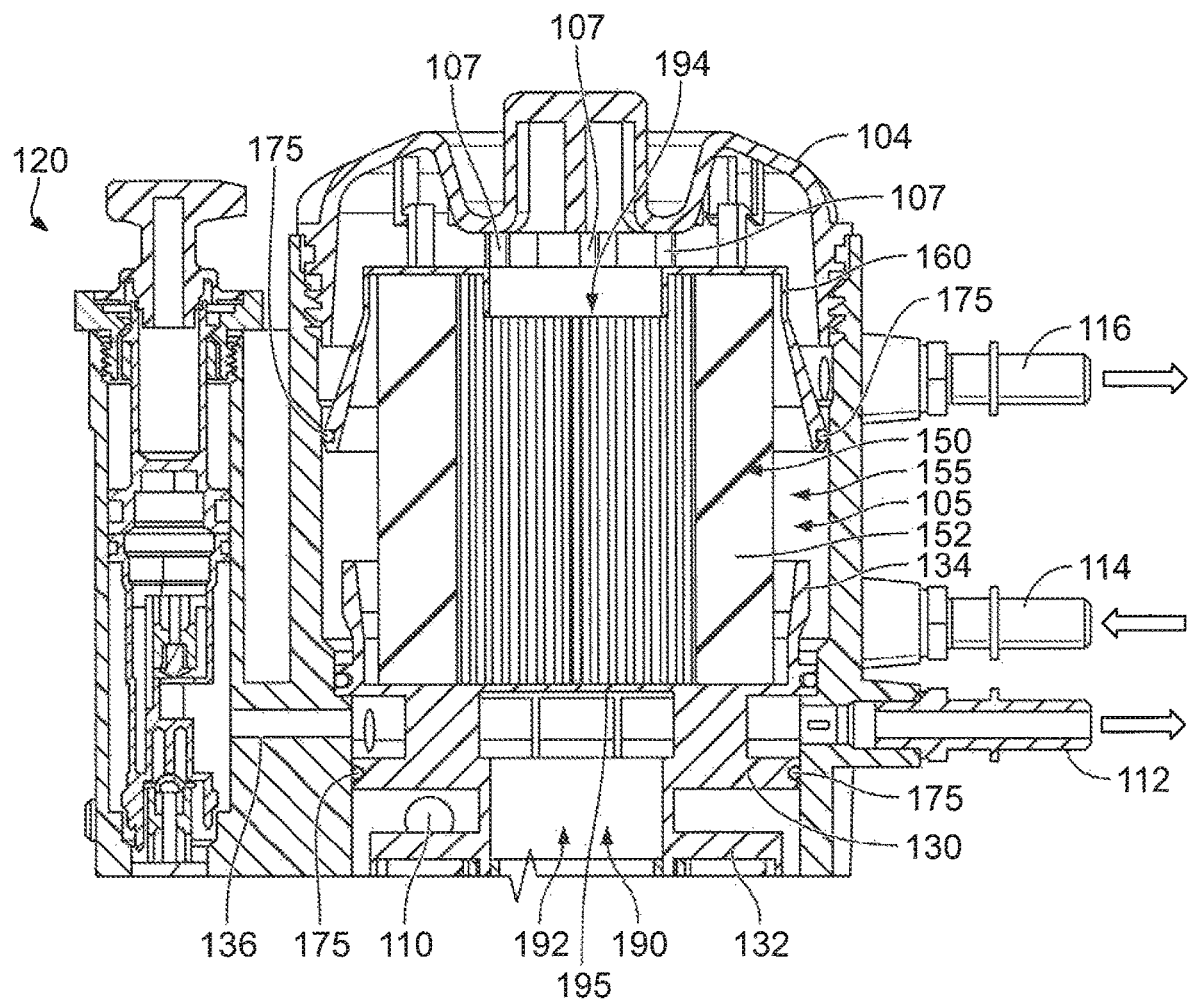
FIG. 6 shows a cross-sectional view of a portion of the filter assembly of FIG. 1.
Figure 7:
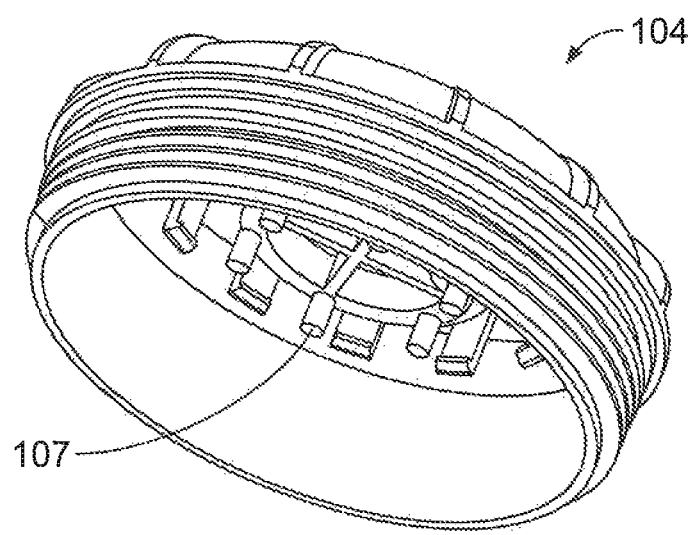
FIG. 7 shows a cover of the filter assembly of FIG. 1.
Figure 8:
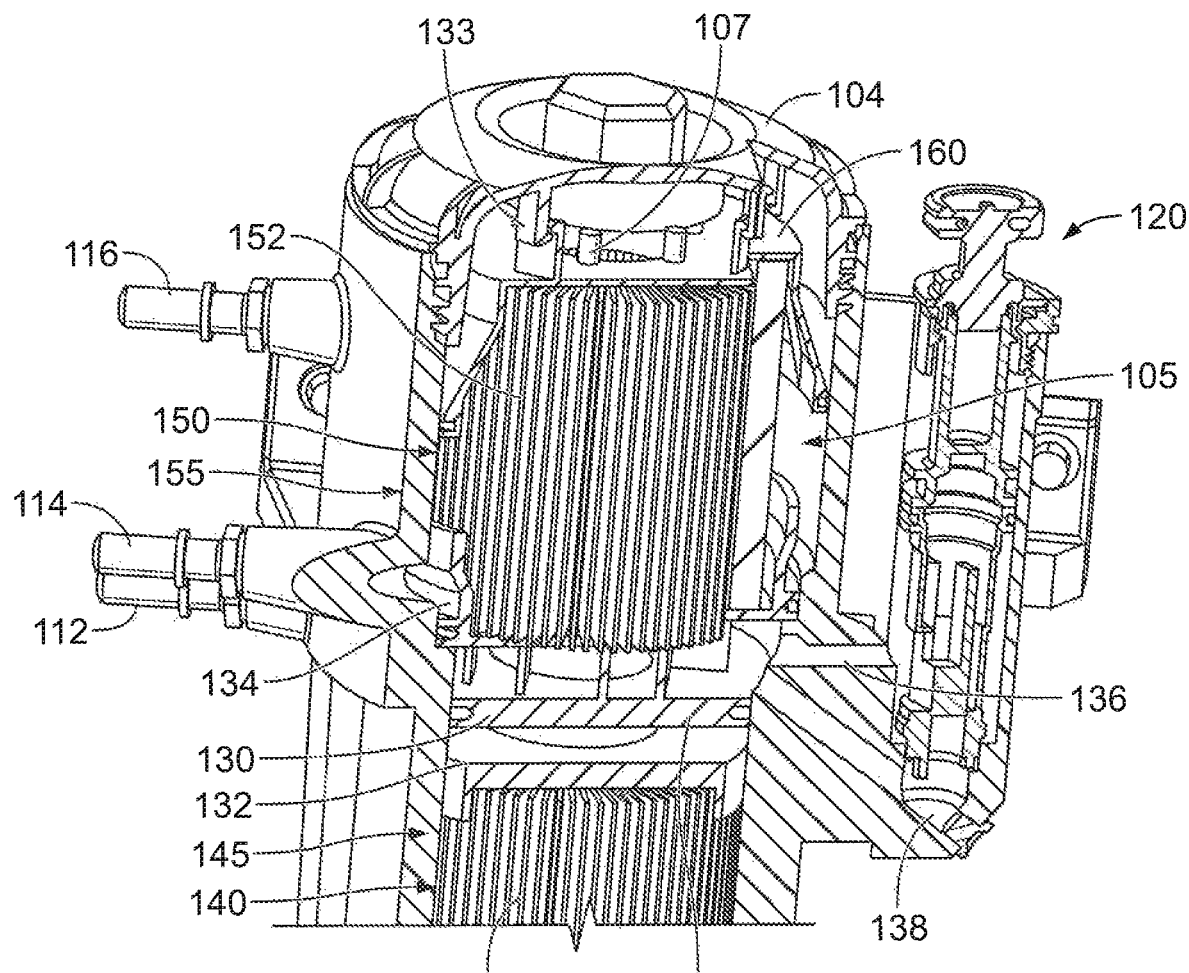
FIG. 8 shows a perspective cross-sectional view of a portion of the filter assembly of FIG. 1.
Figure 12:
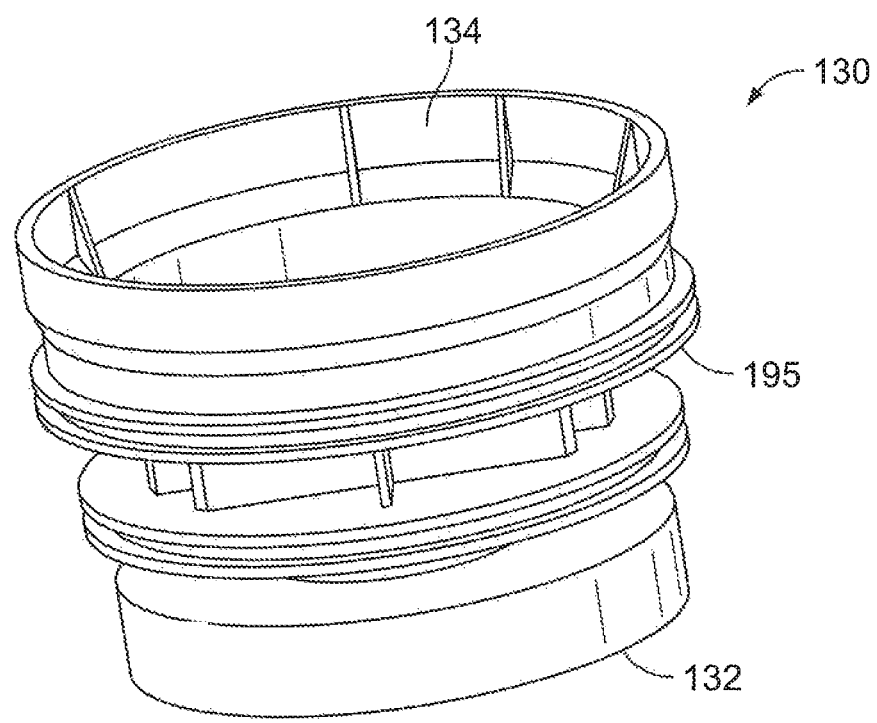
FIG. 12 shows a perspective view of an intermediary plate of the filter assembly of FIG. 1.
Figure 13:
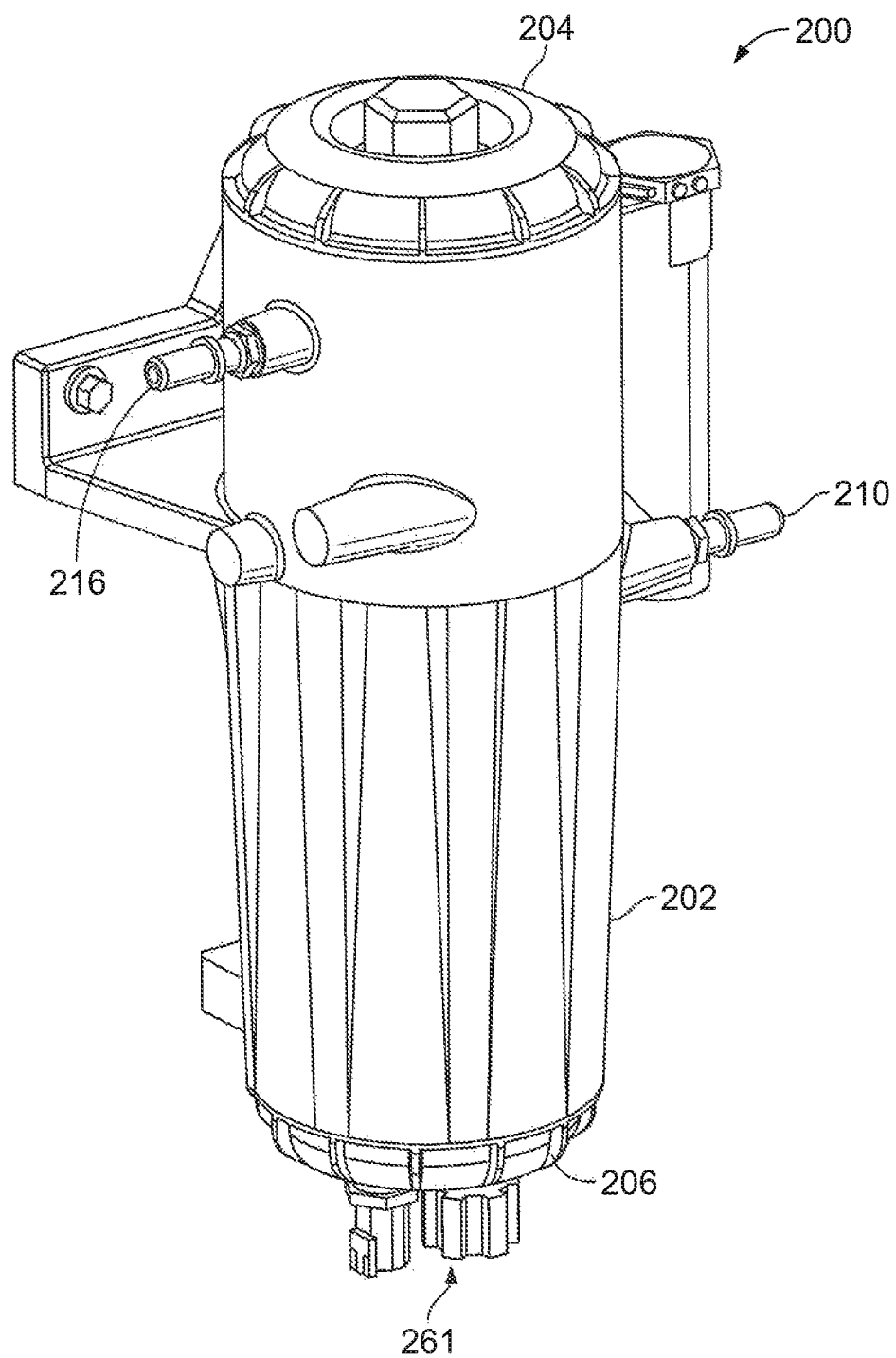
FIG. 13 shows a perspective view of a filter assembly according to another example embodiment.

The first filter media 142 is positioned between a first element top endplate 132 and a first element bottom endplate 170. The first filter media 142 is potted or embedded with the first element top endplate 132 on one axial end and potted or embedded with the first element bottom endplate 170 at the opposite axial end. The second filter element 150 includes second filter media 152 configured to filter a fluid. The second filter media 152 can include various types of filtration media, as described further herein. The second filter media 152 is positioned between a second element top endplate 160 (shown individually in FIG. 11) and a second element bottom endplate 134. The second filter media 152 is potted or embedded with the second element top endplate 160 at one axial end and potted or embedded with the second element bottom endplate 134 at an opposite axial end. The second element top endplate 160 is releasably coupled to the cover 104 via fasteners 133 (e.g., snap-fit fasteners) formed in both the second element top endplate 160 and the cover 104. As shown in FIGS. 6-8, the cover 104 also includes support features 107 configured to abut the second element top endplate 160 when assembled so as to limit axial movement of the filter elements 140, 150. The support features 107 are formed on the underside of the cover 104 (e.g., within second filter chamber 155). The first element top endplate 132 and the second element bottom endplate 134 form a single intermediate endplate 130 (as shown in FIG. 12) positioned between the first and second filter elements 140, 150.

The endplates 132, 134, 160, 170 include sealing members 175 configured to seal against an inner wall of the filter housing 101. Accordingly, the sealing members 175 divide the internal cavity 105 into a first filter chamber 145 including the first filter element 140 and a second filter chamber 155 including the second filter element 150. A third chamber 165 is formed between the sealing member 175 on the first element top endplate 132 and the sealing member 175 on the second element bottom endplate 134. In various arrangements, the sealing members 175 include O-rings and lip seals. In the embodiment shown in FIGS. 3-4, the sealing member 175 positioned on the first element bottom endplate 170 includes a lip seal, the sealing members 175 positioned on the intermediate endplate 130 include O-rings, and the sealing member 175 positioned on the second element top endplate 160 includes an O-ring. In other embodiments, the sealing members 175 may be other combinations of O-rings and lip seals, or can be other types of sealing features.

A center passageway 190 is formed along the longitudinal axis 115 of the filter housing 101. The center passageway 190 is divided between a first center passageway 192 within the first filter chamber 145 and a second center passageway 194 within a second filter chamber 155 by a dividing wall 195 formed as part of the intermediate endplate 130. Filtered fluids in each chamber 145, 155 flow through respective center passageways 192, 194 and toward respective outlets, described below.

As shown in FIG. 4, fluid to be filtered by the filter assembly 100 is first introduced to the first filter element 140 for filtering, and then to the second filter element 150. The filter housing 101 includes a first inlet 110 configured to supply fluid to the first filter chamber 145 to be filtered from, for example, a fuel tank (not shown). As shown in FIG. 4, the incoming fluid flows into the first filter chamber 145 via the first inlet 110, downward along the inner wall of the filter housing 101, and radially inward through the first filter media 142 into the center passageway 192 of the first filter chamber 145. The fluid flows into the third chamber 165 from the center passageway 192, where no filtering occurs in the third chamber 165, but the fluid changes direction (e.g., from flowing substantially axially upward to substantially perpendicular to the longitudinal axis) to flow toward the first outlet 112.

The fluid within the center passageway 192 flows toward a first outlet 112 configured to route the fluid outside of the filter housing 101, where the fluid then reenters the filter housing 101 via a second inlet 114. Upon entering the filter housing 101 via the second inlet 114, the fluid flows into the second filter chamber 155 of the filter housing 101. Within the second filter chamber 155, the fluid flows radially inward toward the longitudinal axis and through the second filter media 152 into the second center passageway 194. Finally, the filtered fluid exits the filter housing 101 via a second outlet 116. One or more of the first inlet 110, first outlet 112, second inlet 114, and second outlet 116 can be integrally formed with the filter housing 101. The intermediate endplate 130 includes various ports (e.g., flow paths, channels) allowing fluids to flow therethrough, including ports for the first inlet 110 and the first outlet 112, and priming pump ports fluidly coupled to the pump 120.

In another embodiment, fluid to be filtered by the filter assembly 100 flows in a reverse direction from that shown in FIG. 4. As such, fluid to be filtered by the filter assembly flows in a radially outward direction through the first filter media 142 and the second filter media 152. Accordingly, the fluid enters the filter housing 101 from the second outlet 116 and into the second center passageway 194. The fluid flows radially outward away from the longitudinal axis, through the second filter media 152, and downward toward the first filter chamber 145 through the second inlet 114 and the first outlet 112. The fluid then enters the first filter chamber 145 within the first center passageway 192 and flows radially outward through the first filter media 142 toward the inner wall of the filter housing 101 and toward the first inlet 110, where the fluid exits the filter assembly 100.

In another embodiment, a first fluid to be filtered by the filter assembly 100 is first introduced to the first filter element 140 for filtering, and a second fluid to be filtered by filter assembly 100 is introduced to the second filter element 150. The filter housing 101 includes a first inlet 110 configured to supply the first fluid to the first filter chamber 145 to be filtered from, for example, a fuel tank (not shown). The filter housing 101 includes a second inlet 114 configured to supply the second fluid to the second filter chamber 155 to be filtered from, for example, an oil tank (not shown). As shown in FIG. 4, the incoming first fluid flows into the first filters chamber 145 via the first inlet 110, downward along the inner wall of the filter housing 101, and radially inward through the first filter media 142 into the center passageway 192 of the first filter chamber 145 and exits via the first outlet 112. The incoming second fluid flows into the second filter chamber 155 via the second inlet 114, upward along the inner wall of the filter housing 101, and radially inward through the second filter media 152 into the center passageway 194 of the second filter chamber 155 and exits via the second outlet 116. In other embodiments, the first filter element 140 and second filter element 150 are arranged (e.g., plumbed) in a parallel configuration instead of in a series filtration configuration as described herein.

Figure 1A:
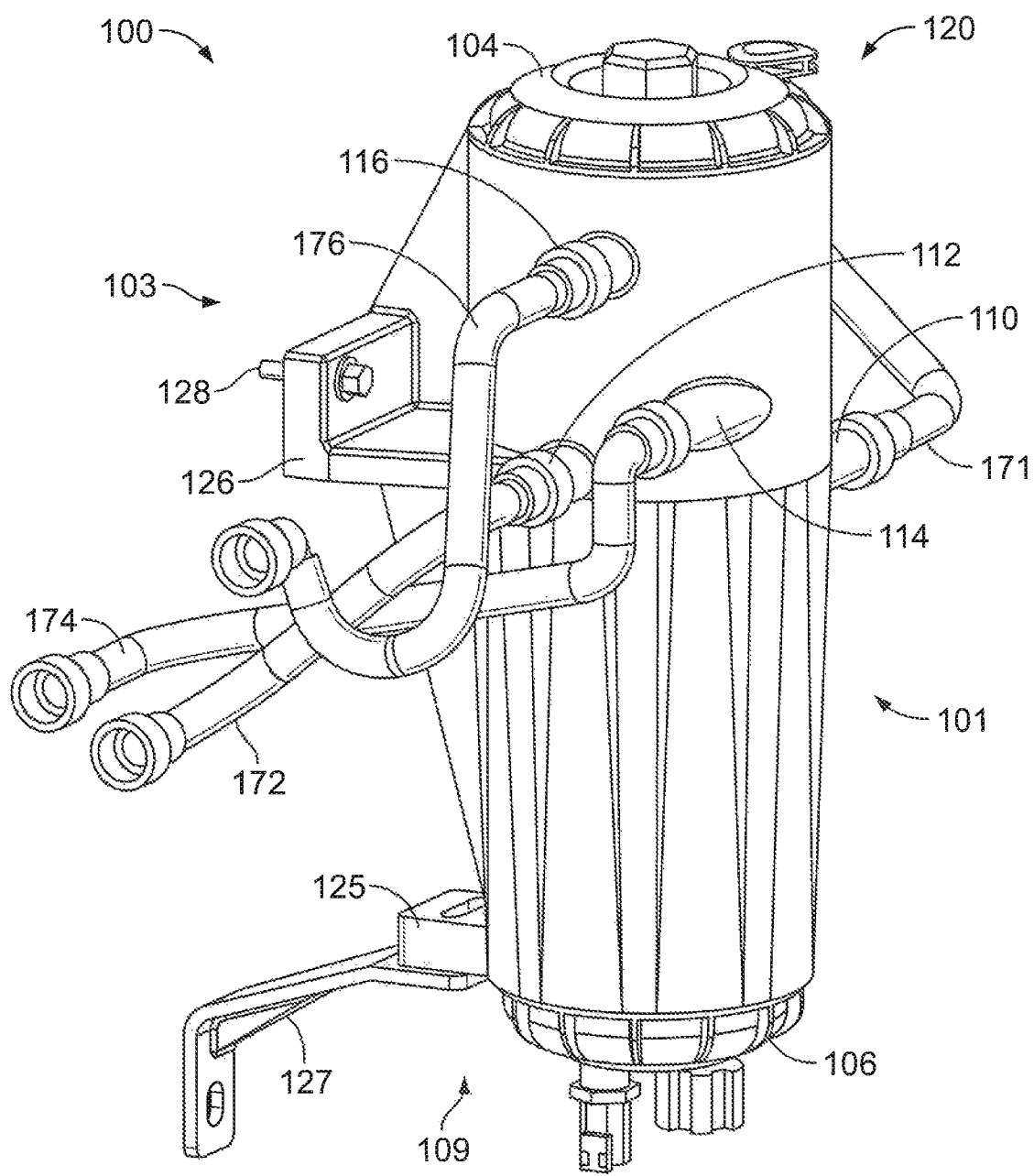
FIG. 1A shows a perspective view of a filter assembly including attached fluid conduits in accordance with another embodiment.
Figure 2:
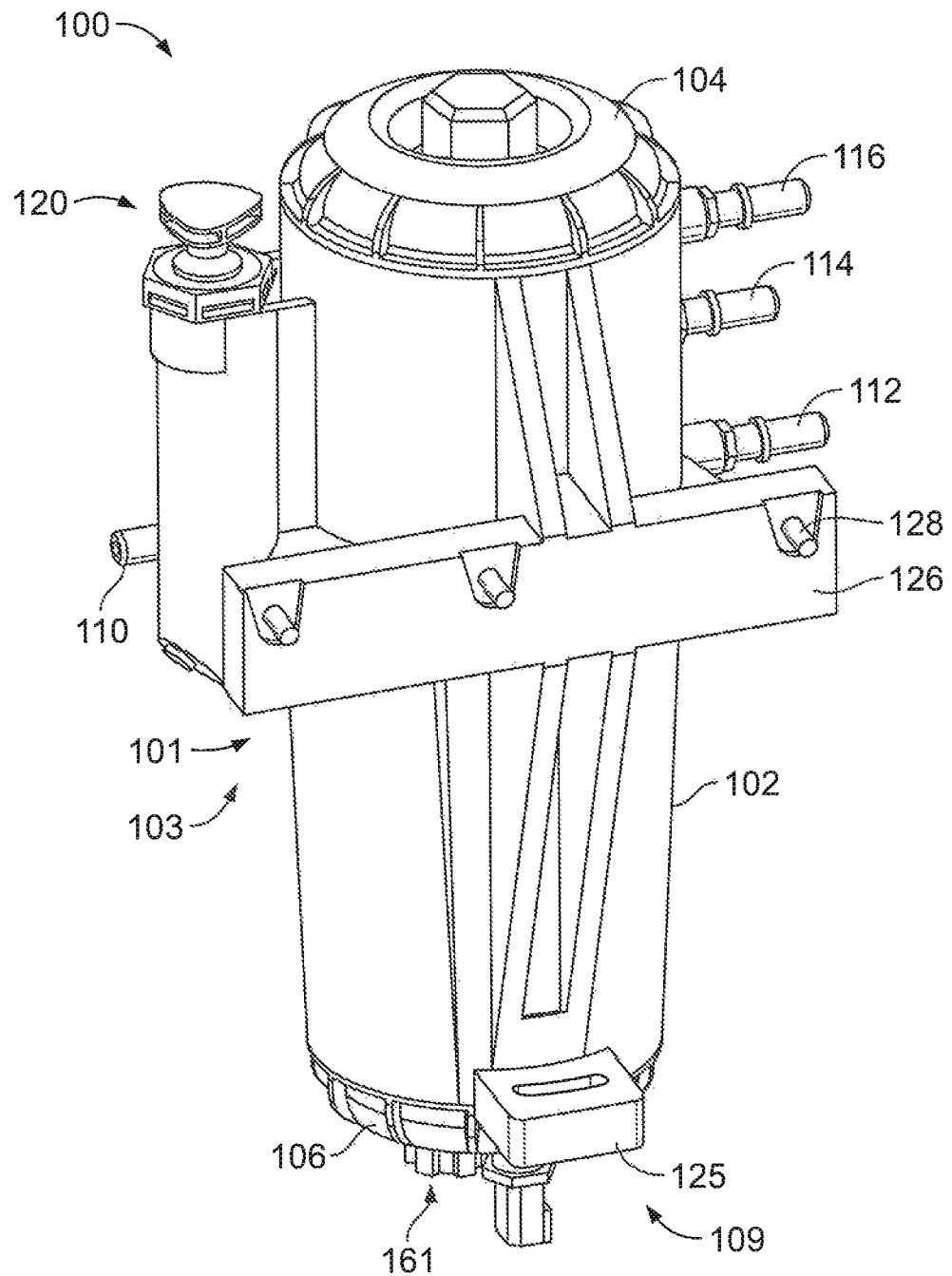
FIG. 2 shows a rear perspective view of the filter assembly of FIG. 1.
Figure 2A:
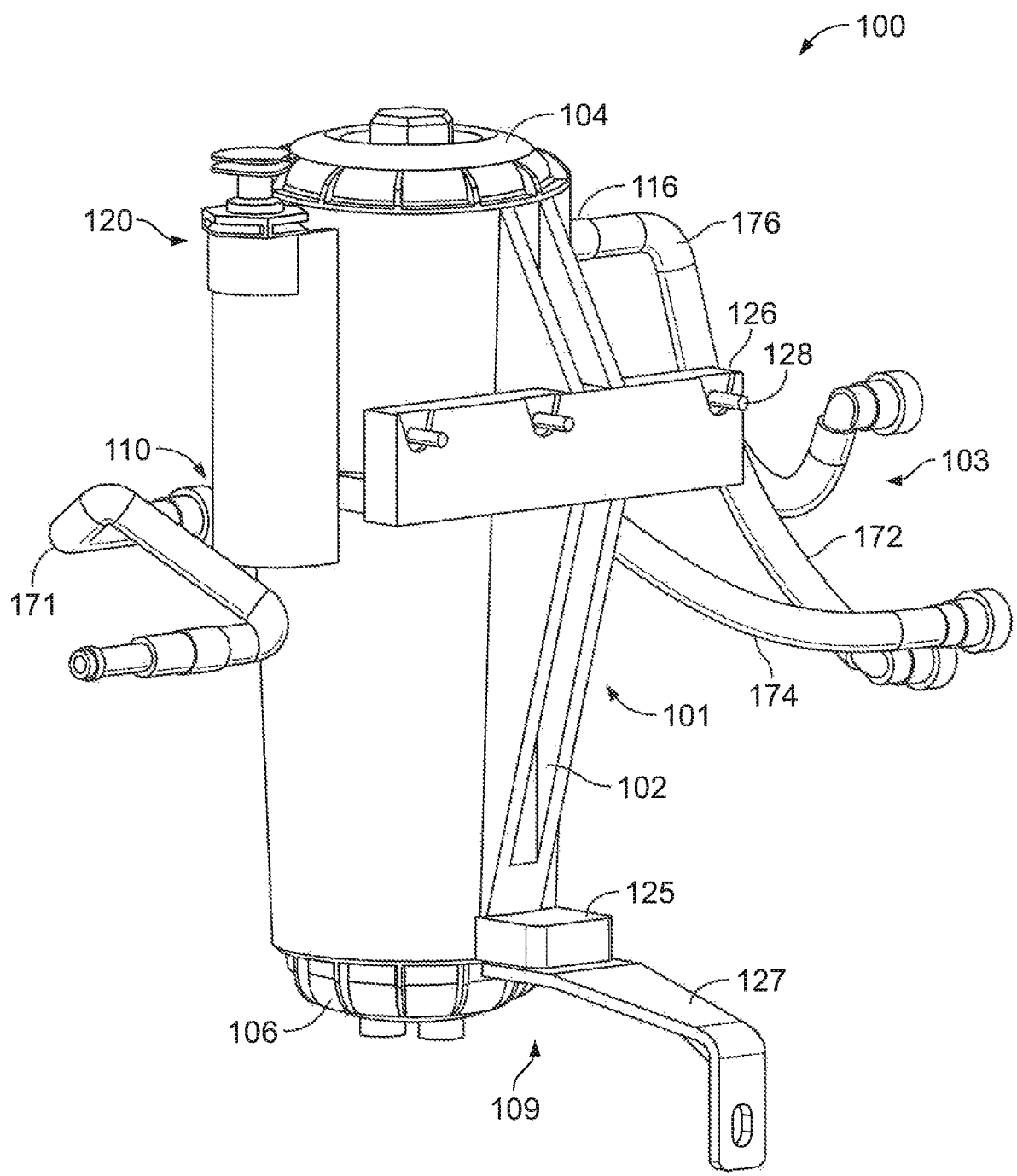
FIG. 2A shows a rear perspective view of the filter assembly of FIG. 1A including attached fluid conduits.

Referring back to FIGS. 1A and 2A, the fluid inlets and outlets (e.g., first inlet 110, first outlet 112, second inlet 114, and second outlet 116) into the filter housing 101 are configured to releasably couple to various fluid conduits leading to different components of an engine. For example, the first inlet 110 can be coupled via fluid conduit 171 to a fuel tank of an engine and the second outlet 116 can be coupled via fluid conduit 176 to a fuel delivery system of an engine. In other embodiments, the fluid conduits couple to components outside of the engine such as when used with an air/oil separator for filtering fluids exiting the engine. In other embodiments, the fluid conduits couple to different fluid systems, such as when one filter element is used to filter fuel and the second filter element is used to filter oil.

Figure 5:
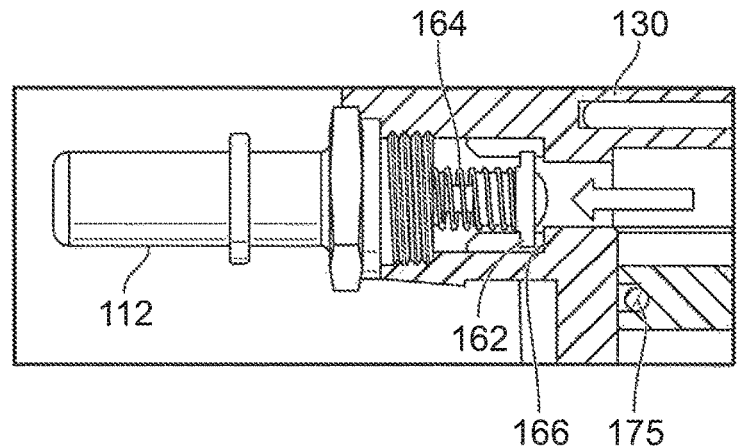
FIG. 5 shows a check valve of the filter assembly of FIG. 1 according to an example embodiment.

Referring to FIG. 5, the first outlet 112 includes a one-way check valve 162 integrated into the filter housing 101. The check valve 162 moves between a closed position and an open position. The check valve 162 is biased by a biasing member 164 toward the closed position. In the closed position, the check valve 162 seals against an interface 166 formed within the housing 101 so as to fluidly decouple the first outlet 112 from the first filter chamber 145. Accordingly, for a fluid to exit the first filter chamber 145 via the first outlet 112, the pressure exerted on the check valve 162 must overcome the force of the biasing member 164. If overcome, fluid can freely flow out of the filter housing 101 via the first outlet 112. In some embodiments, the filter assembly 100 does not include a check valve 162.

Referring to FIG. 8, the filter assembly 100 includes a priming pump 120. The priming pump 120 is a manual priming pump. The priming pump 120 includes a priming pump inlet 136 and a priming pump outlet 138. The priming pump 120 is shown as positioned downstream of the first filter chamber 145 and upstream of the second filter chamber 155. The priming pump 120 can be otherwise positioned. The priming pump 120 is configured to suction fluid into the first filter chamber 145 and through a first filter element 140 and to pump the fluid out of the filter housing 101 via the first outlet and again into the second filter chamber 155 via the second inlet 114 to be filtered by the second filter element 150. Accordingly, the priming pump 120 provides the pressure differential between the first filter chamber 145 and the second filter chamber 155 to route the fluid through the filter assembly 100. As shown in FIG. 8, the priming pump 120 is integrated with the filter housing 101. In other embodiments, the priming pump 120 can be separately attached to the housing 101. The intermediate endplate 130 can incorporate ports (e.g., flow paths, channels) fluidly coupled with the priming pump 120 and configured to allow passage of fluid through the intermediate endplate 130 for use with the filter assembly 100. In other embodiments, the filter assembly 100 does not include a priming pump 120. In embodiments with no priming pump 120, the filter assembly 100 may or may not include a check valve 162. The check valve 162 can be included without the priming pump 120 to serve as an anti-siphon valve and to aid in servicing/cleaning the filter.

Figure 14:
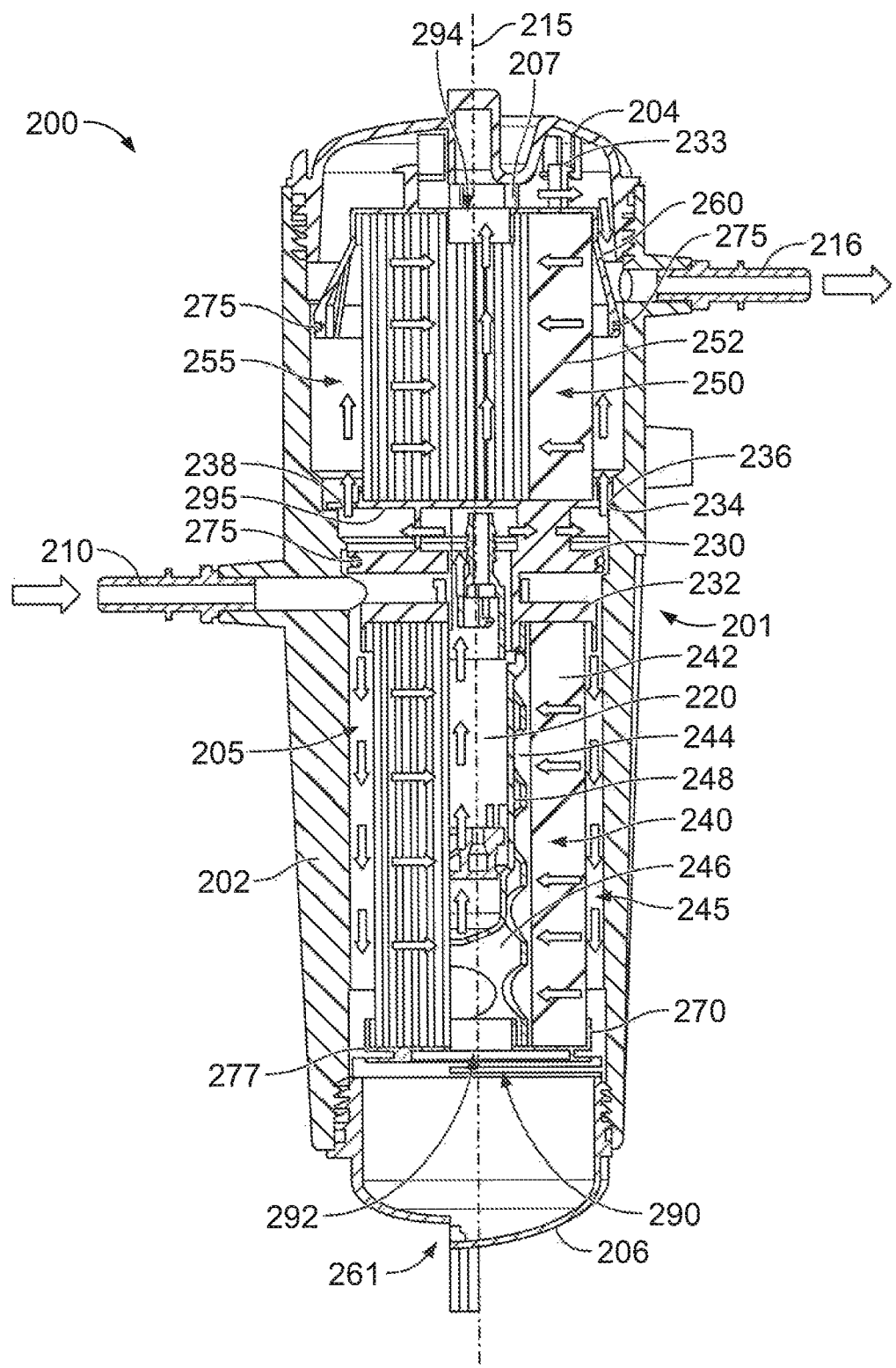
FIG. 14 shows a cross-sectional view of the filter assembly of FIG. 13.
Figure 15:
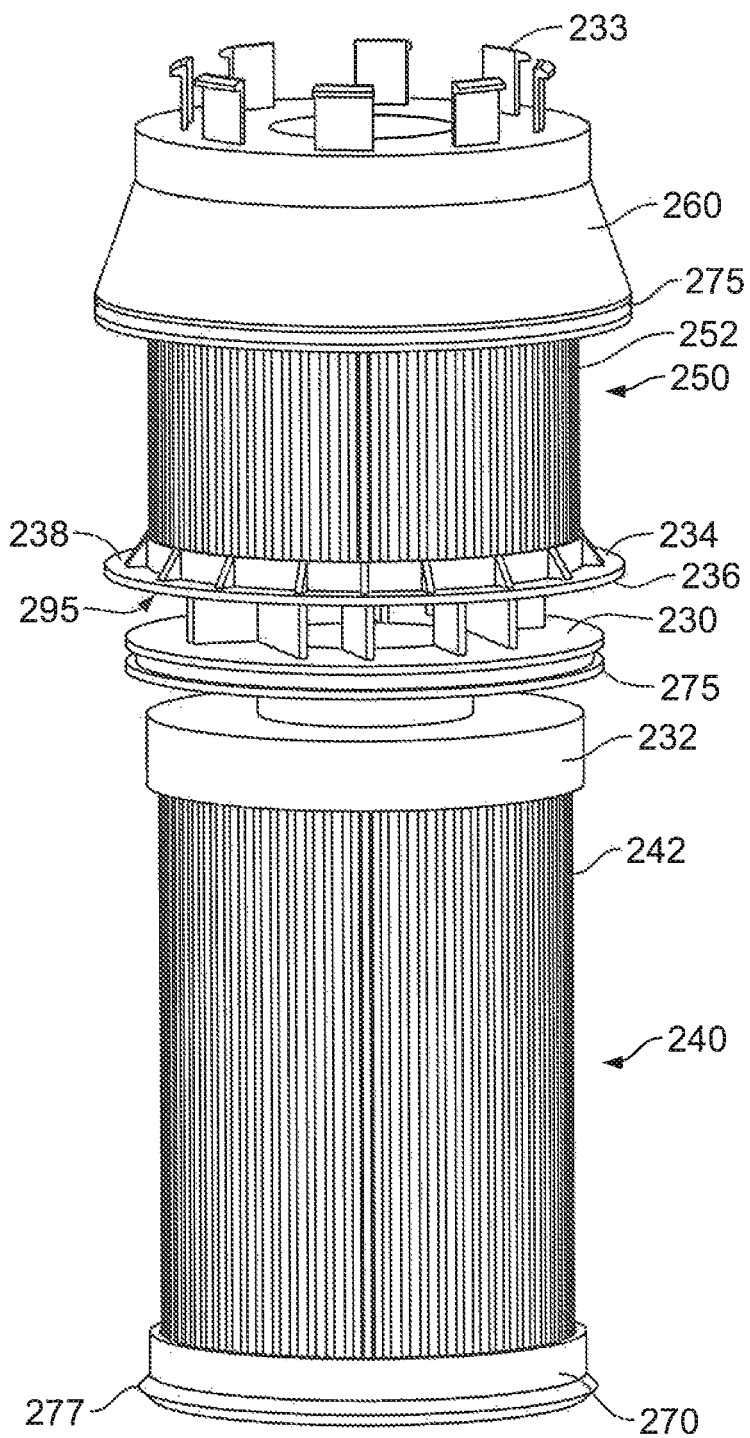
FIG. 15 shows a perspective view of a filter element of the filter assembly of FIG. 13.
Figure 16:
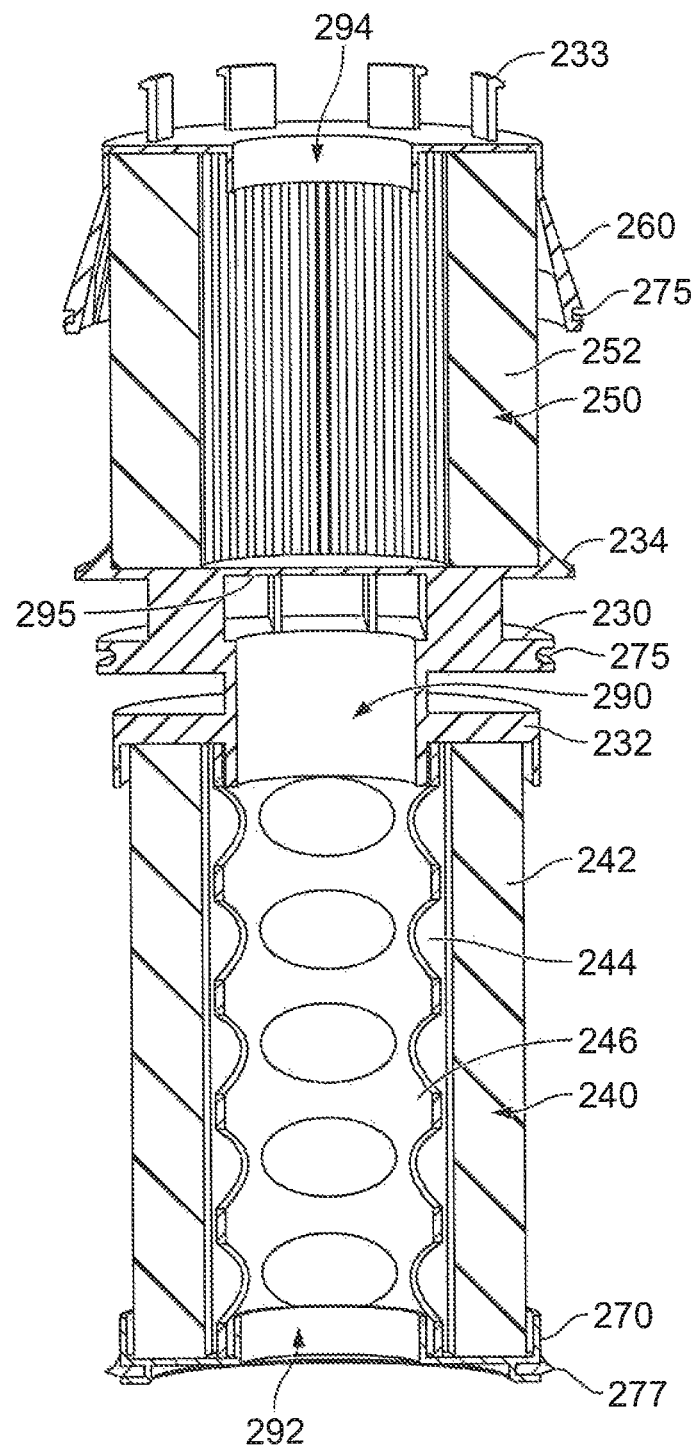
FIG. 16 shows a cross-sectional view of the filter element of FIG. 15.
Figure 17:
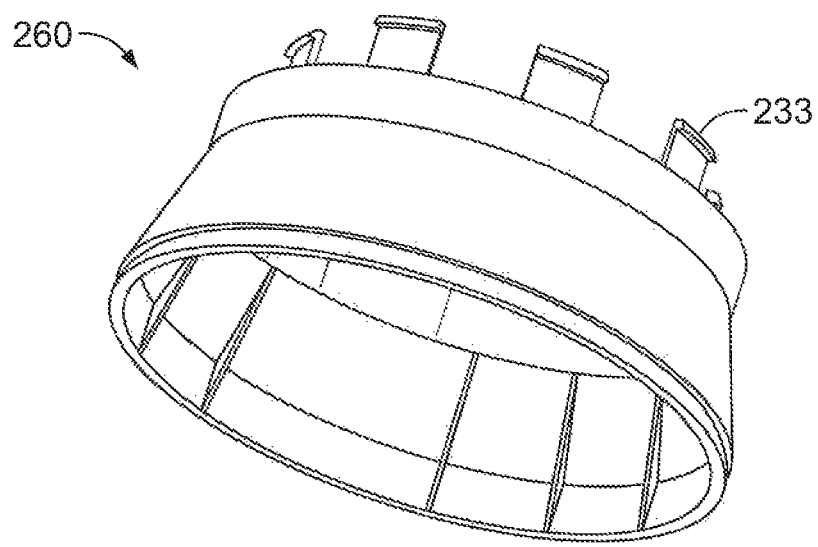
FIG. 17 shows a perspective view of a second element top endplate of the filter assembly of FIG. 13.

Referring to FIGS. 13-18, a filter assembly 200 according to another example embodiment is shown. The filter assembly 200 includes a filter housing 201 having an internal cavity 205, a first filter element 240, and a second filter element 250. The filter housing 201 includes a main housing portion 202, a cover 204, and a reservoir 206. As shown in FIG. 14, the first filter element 240 and the second filter element 250 are positioned within the internal cavity 205 of the filter housing 201. The first and second filter elements 240, 250 are cylindrical filter elements. The first filter element 240 and second filter element 250 are positioned one above the other (e.g., axially stacked) along the longitudinal axis 215 of the filter housing 201. The first filter element 240 and the second filter element 250 may be part of a single combined filter insert (as shown in FIGS. 15-16) configured to be inserted into the filter housing 201 as a single piece during assembly. In other embodiments, the first filter element 240 and the second filter element 250 are otherwise assembled (e.g., separately assembled) into the filter housing 201.

Figure 18:
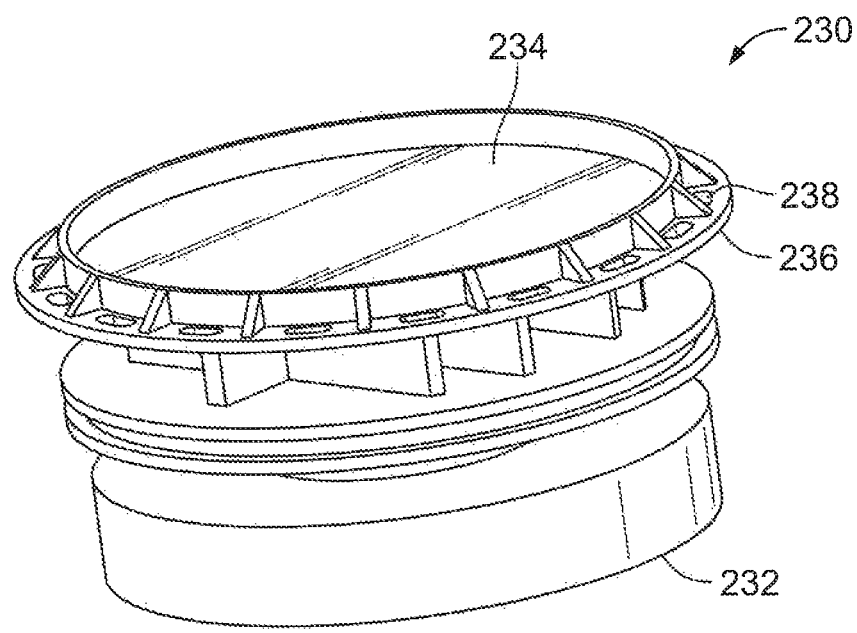
FIG. 18 shows a perspective view of an intermediary plate of the filter assembly of FIG. 13.

The first filter element 240 includes a first filter media 242 configured to filter a fluid. The second filter element 250 includes a second filter media 252 configured to filter a fluid. The first filter media and the second filter media 242, 252 can include various types of filtration media, as described further herein. The first filter element 240 can also include a coalescing media 244 similar to the coalescing media 144 of FIGS. 1-13. Thus, separated water coalesces and drops into the reservoir 206, which includes a drain outlet 261 for removing separated water from the filter assembly 200. Similar to FIGS. 1-13 described above, a center tube 246 is positioned within the center of the first filter media 242. The center tube 246 is configured to support the first filter media 242 and to allow fluid flow through the first filter media 242. The first filter media 242 is positioned between a first element top endplate 232 and a first element bottom endplate 270. The second filter media 252 is positioned between a second element top endplate 260 (shown individually in FIG. 17) and a second element bottom endplate 234. The first element top endplate 232 and the second element bottom endplate 234 form a single intermediate endplate 230 (as shown in FIG. 18) positioned between the first and second filter elements 240, 250.

The intermediate endplate 230, the first element bottom endplate 270, and the second element top endplate 260 include sealing members 275 configured to seal against an inner wall of the filter housing 201. Accordingly, the sealing member 275 positioned on the intermediate endplate 230 divides the internal cavity 205 into a first filter chamber 245 including the first filter element 240 and a second filter chamber 255 including the second filter element 250. Filter assembly 200 does not require sealing of the second element bottom endplate 234. Accordingly, fluid freely flows around the outside perimeter of the second element bottom endplate 234, as described further herein.

Figure 19:
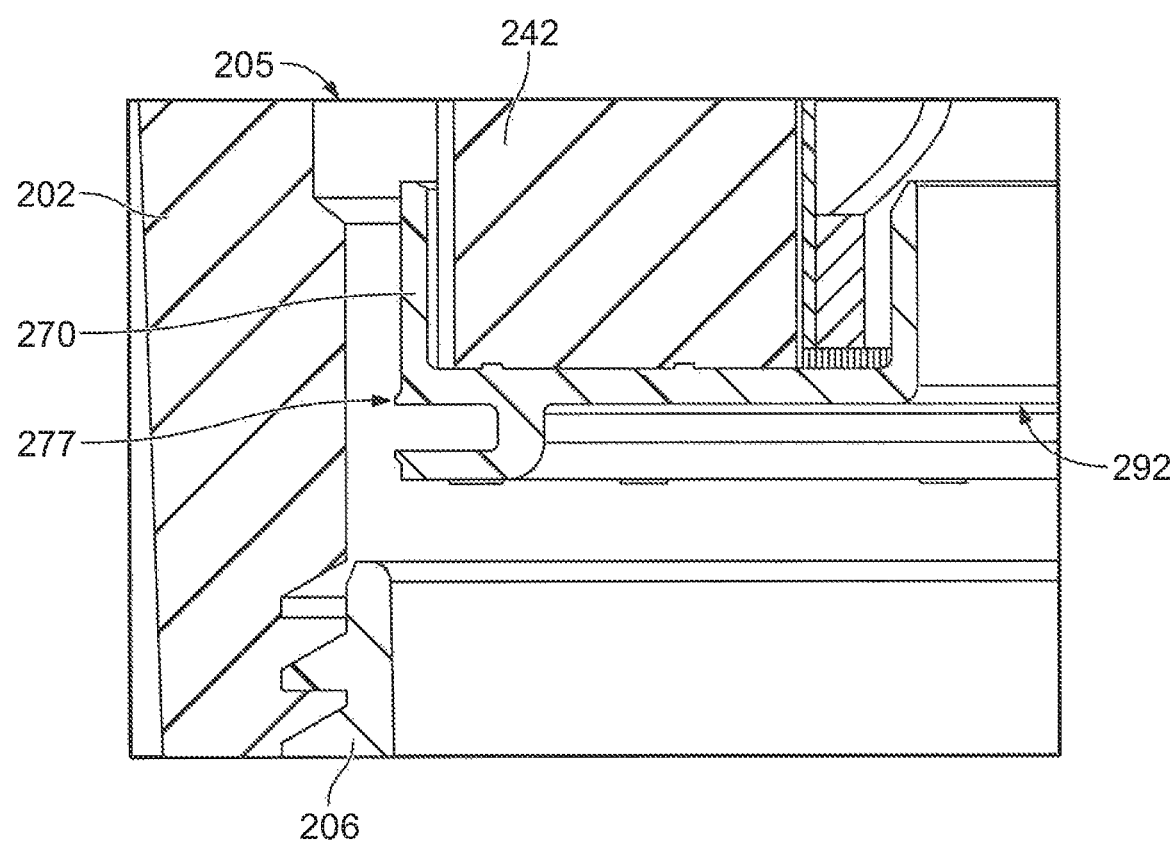
FIG. 19 shows a cross-sectional view of a portion of the filter assembly of FIGS. 1 and 13.

In various arrangements, the sealing members 275, 277 include O-rings and lip seals. In the embodiment shown in FIGS. 14-16, the sealing member 277 positioned on the first element bottom endplate 270 of the first filter element 240 includes a lip seal (separately shown in FIG. 19), the sealing member 275 positioned on the intermediate endplate 230 includes an O-ring, and the sealing member 275 positioned on the second filter top endplate 260 of the second filter element 250 includes an O-ring. In other embodiments, the sealing members 275, 277 may be other combinations of O-rings and lip seals, or can be other types of sealing features.

A center passageway 290 is formed along the longitudinal axis 215 of the filter housing 201. The center passageway 290 is divided between a first center passageway 292 within the first filter chamber 245 and a second center passageway 294 within a second filter chamber 255 by a dividing wall 295 formed as part of the intermediate endplate 230. Filtered fluids in each chamber 245, 255 flow through respective first and second center passageways 292, 294 and toward respective outlets, described below.

As shown in FIG. 14, fluid to be filtered by the filter assembly 200 is first introduced to the first filter element 240 for filtering, and then to the second filter element 250. The filter housing 201 includes a first inlet 210 configured to supply fluid to the first filter chamber 245 to be filtered from, for example, a fuel tank (not shown). As shown in FIG. 14, the incoming fluid flows into the first filter chamber 245 via the first inlet 210, downward along the inner wall of the filter housing 201, and radially inward through the first filter media 242 and into the center passageway 292 of the first filter chamber 245.

The fluid within the center passageway 292 flows upward toward the intermediate endplate 230, where it is redirected radially around the perimeter of the intermediate endplate 230 (e.g., fluid flows toward and contacts the dividing wall 295, which redirects the fluid radially outward toward the inner wall of the filter housing 201). The intermediate endplate 230 includes a flange 236 having multiple apertures 238 (shown in FIG. 18) extending through the flange 236 of the endplate 230. The apertures 238 extend substantially in the axially direction relative to the longitudinal axis 215 of the housing (e.g., perpendicular to the dividing wall 295 of the intermediate endplate 230). The fluid flows through the apertures 238 and into the second filter chamber 255. Within the second filter chamber 255, the fluid flows through the second filter media 252 and into the second center passageway 294. Finally, the filtered fluid exits the filter housing 201 via a second outlet 216.

In another embodiment, fluid to be filtered by the filter assembly 200 flows in a reverse direction from that shown in FIG. 14. As such, fluid to be filtered by the filter assembly flows in a radially outward direction through the first filter media 242 and the second filter media 252. Accordingly, the fluid enters the filter housing 201 from the second outlet 216 and into the second center passageway 294. The fluid flows radially outward away from the longitudinal axis 215, through the second filter media 252, and downward toward the intermediate endplate 230, where it flows around the perimeter of the intermediate endplate 230 through the apertures 238 and into the first filter chamber 245. The fluid enters the first filter chamber 245 within the first center passageway 292 and flows radially outward through the first filter media 242 toward the inner wall of the filter housing 201 and toward the first inlet 210, where the fluid exits the filter assembly 200.

Referring to FIG. 14, the filter assembly 200 includes a priming pump 220. The priming pump 220 is an electric priming pump. In another embodiment, the priming pump 220 is a lift pump. The priming pump 220 is shown as positioned within the first center passageway 292 of the first filter chamber 245 and downstream of the first filter media 242. The priming pump 220 can be otherwise positioned. The priming pump 220 is configured to suction fluid into the first filter chamber 245 and through a first filter element 240 and to pump the fluid upward toward the second filter chamber 255 to be filtered by the second filter element 250. Accordingly, the priming pump 220 provides the pressure differential between the first filter chamber 245 and the second filter chamber 255 to route the fluid through the filter assembly 200. As shown in FIG. 14, the priming pump 220 is integrated with the filter housing 201. In other embodiments, the priming pump 220 can be separately attached to the housing 201.

Figure 20:
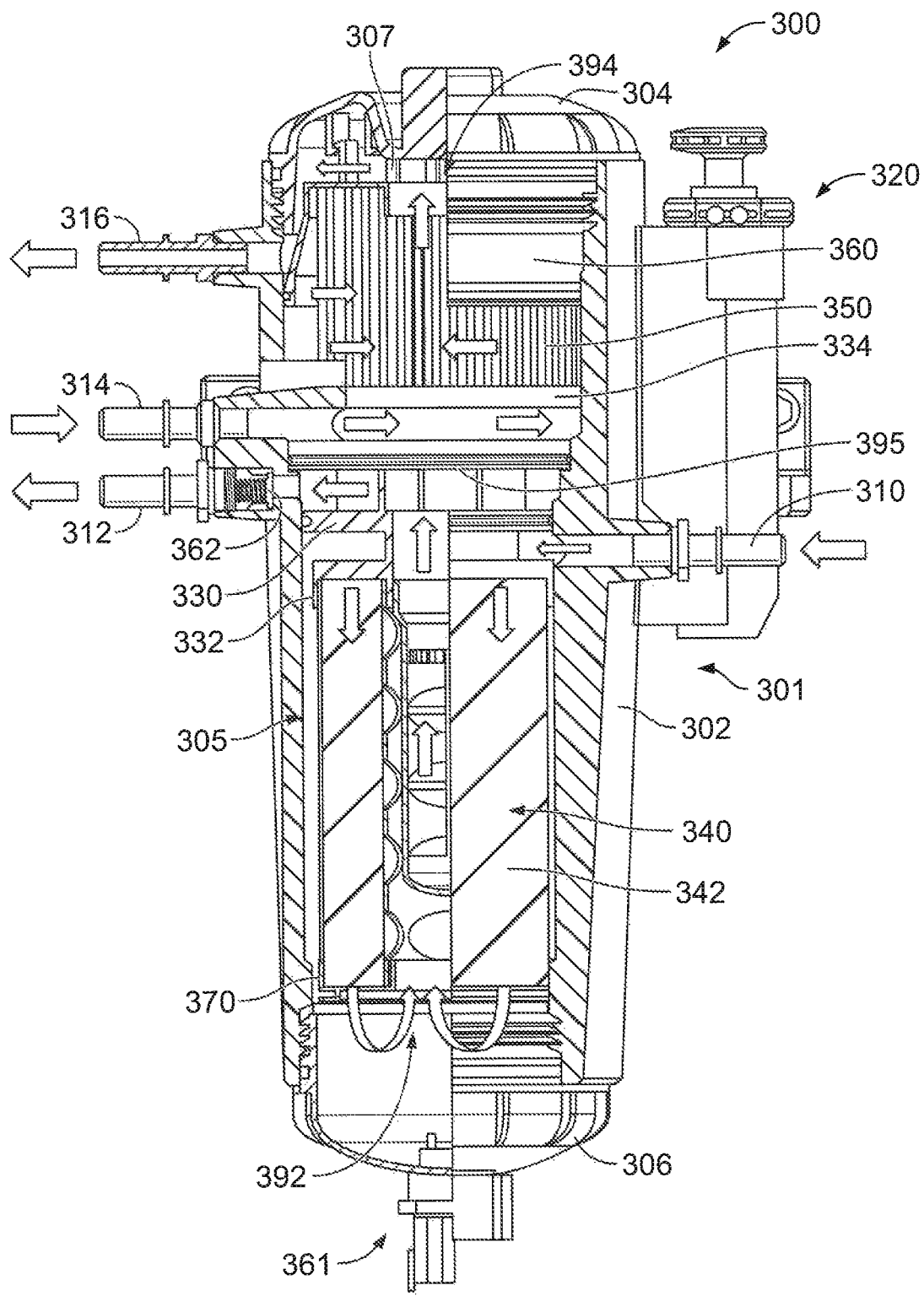
FIG. 20 shows a cross-sectional view of a filter assembly according to another example embodiment.
Figure 21:
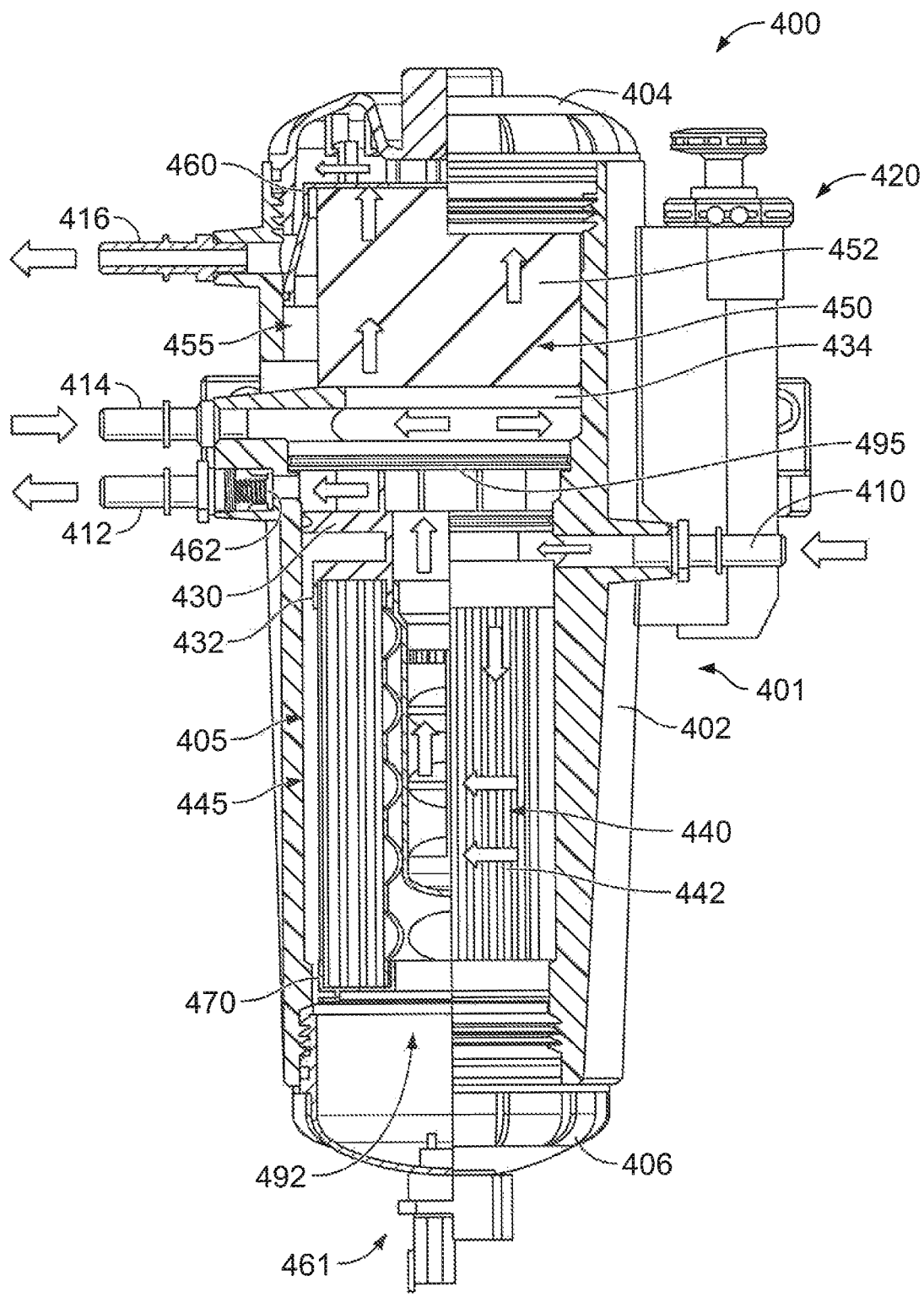
FIG. 21 shows a cross-sectional view of a filter assembly according to another example embodiment.
Figure 22:
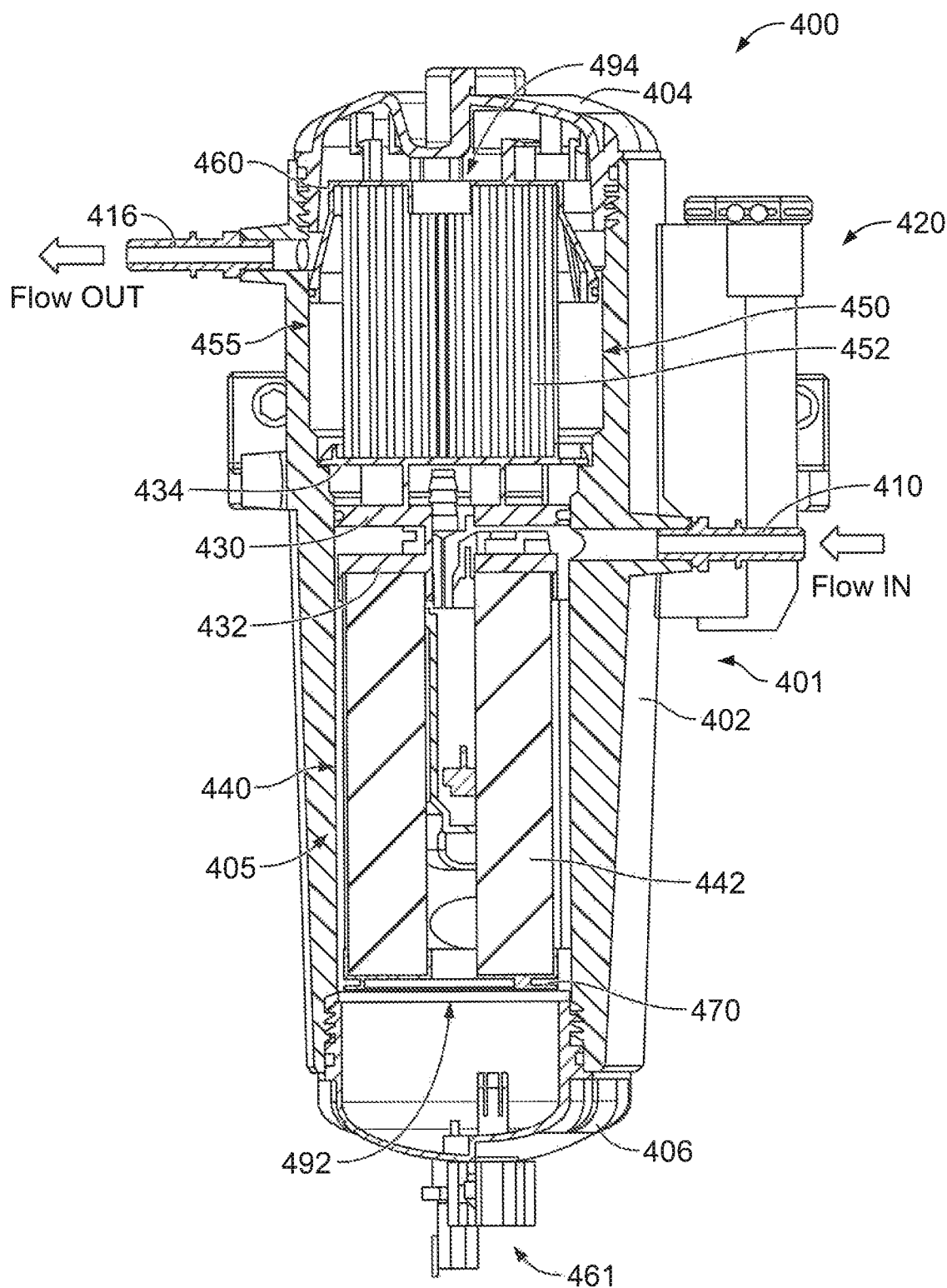
FIG. 22 shows a cross-sectional view of a filter assembly according to another example embodiment.

Referring to FIGS. 20-21, further embodiments of a filter assembly is shown. The filter assemblies 300, 400 include flow-through filter media. Instead of endplates that seal the filter media on each side, the filter assemblies 300, 400 include supporting structures (e.g., supporting structures 330, 332, 334, 360, 370) at least some of which that allow for the axial entrance and exit of fluid to and from the media. As shown in FIG. 20, the first filter media 342 may comprise tetrahedral filter media defined by a plurality of tetrahedron channels as described in U.S. Pat. No. 8,397,920, which is incorporated herein by reference in its entirety, and the second filter media 352 may be pleated filter media. As shown in FIG. 21 and as similarly shown in FIG. 22, the first filter media 442 may be pleated media and the second filter media 452 may comprise tetrahedral filter media. In other embodiments, the filter media may include fluted filter media or any other flow-through filter media arrangement.

Figure 23:
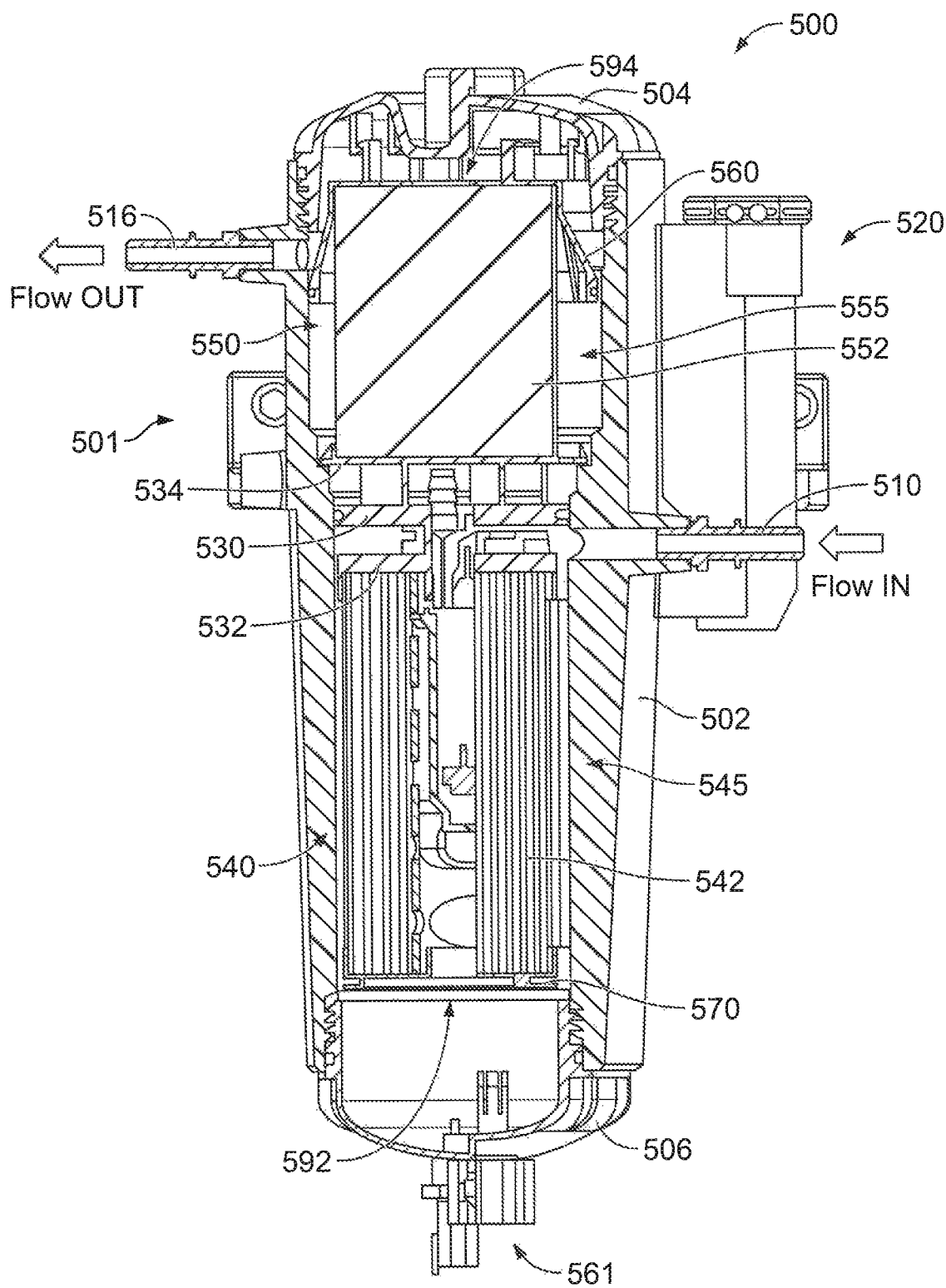
FIG. 23 shows a cross-sectional view of a filter assembly according to another example embodiment.
Figure 24:
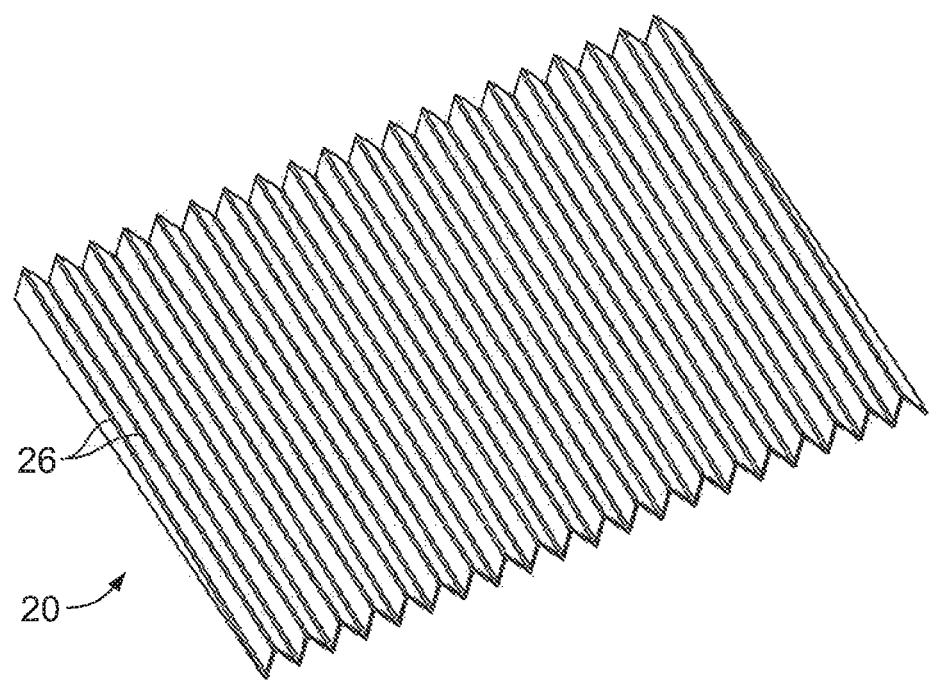
FIG. 24 is a perspective view of filter media according to an example embodiment.
Figure 25:
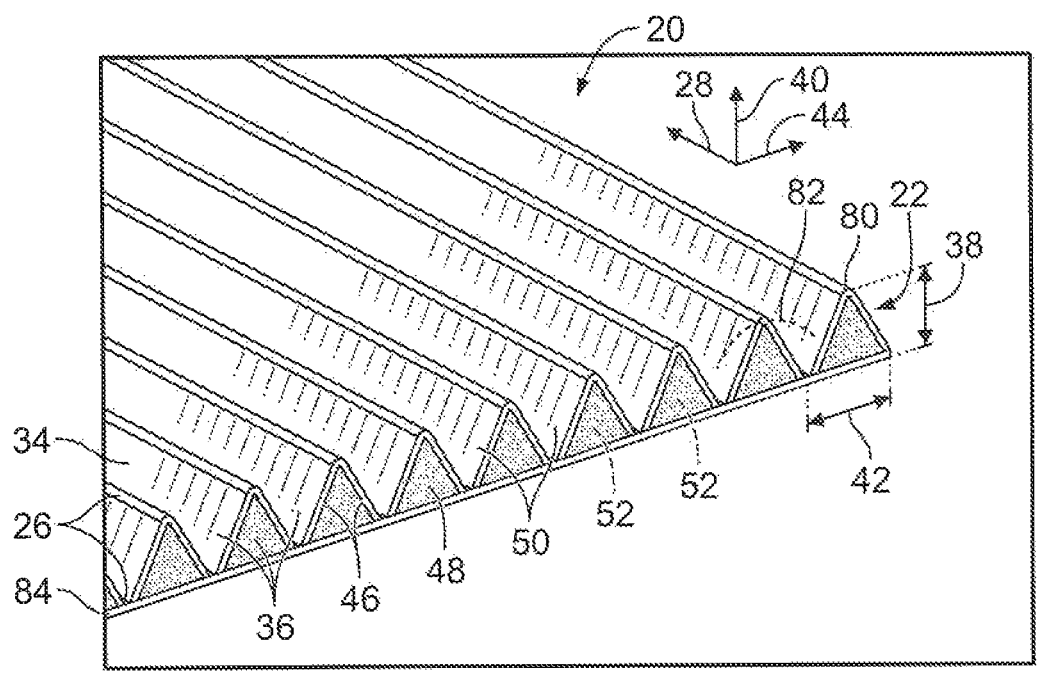
FIG. 25 is an enlarged perspective view of filter media according to an example embodiment.
Figure 26:
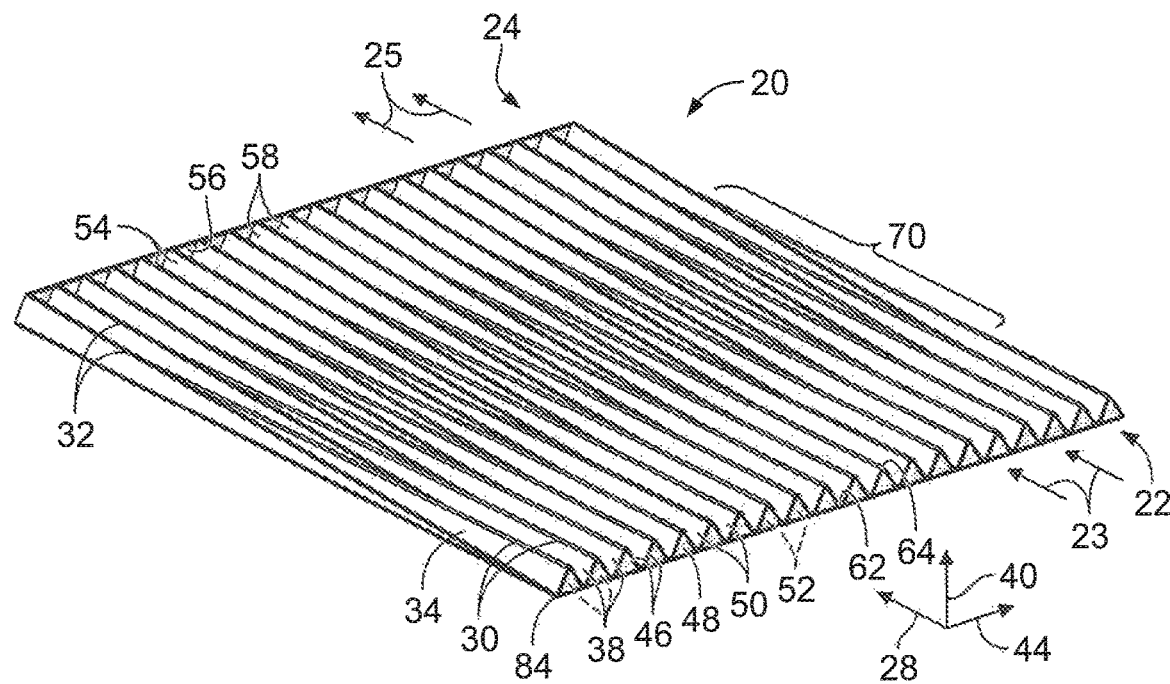
FIG. 26 is like FIG. 24 and shows further construction of the filter media from the inlet end.
Figure 27:
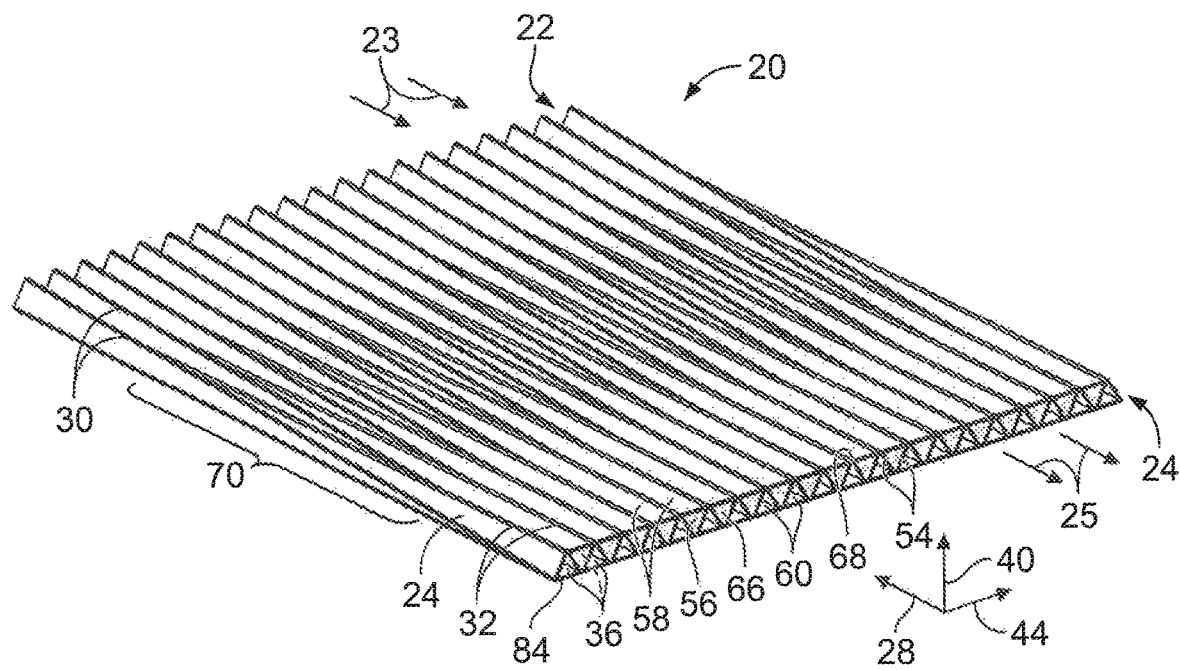
FIG. 27 is like FIG. 24 and shows further construction of the filter media from the outlet end.
Figure 28:
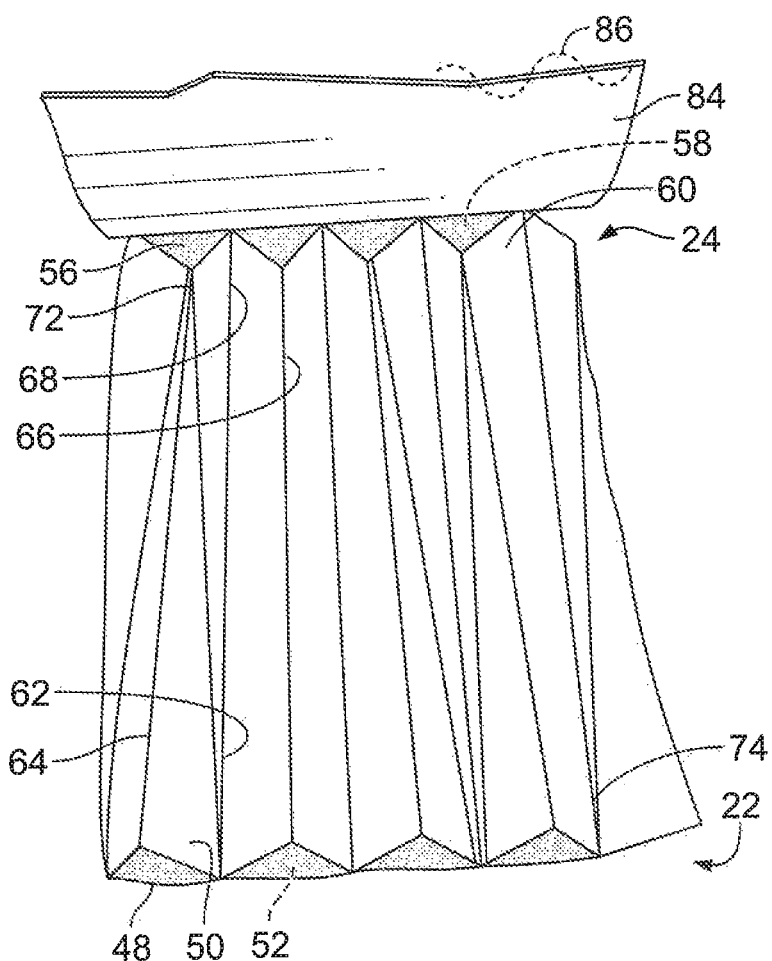
FIG. 28 is an exploded perspective view showing a portion of filter media.
Figure 29:
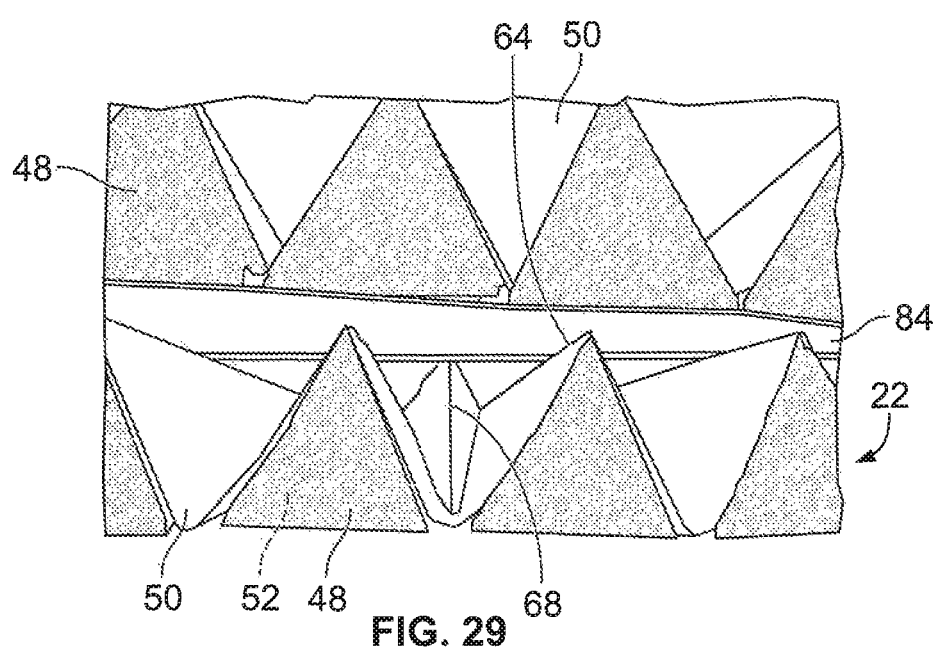
FIG. 29 is an enlarged perspective view showing a portion of filter media in accordance with the disclosure.
Figure 30:
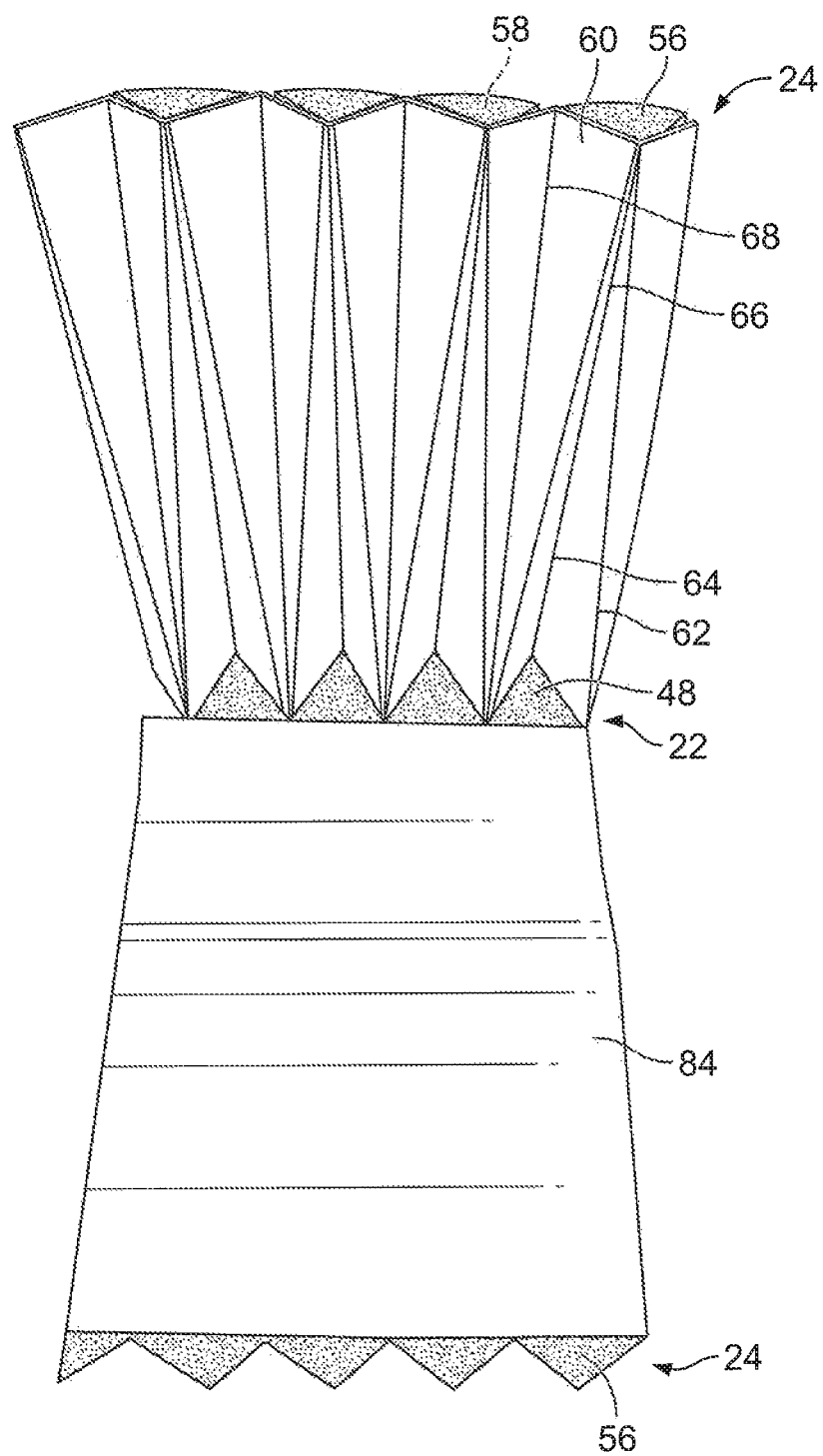
FIG. 30 is like FIG. 28 and is a view from the opposite end.

Referring to FIG. 23, another embodiment of a filter assembly is shown. The filter assembly 500 includes flow-through filter media. Instead of endplates that seal the filter media on each side, the filter assembly 500 include supporting structures (e.g., e.g., supporting structures 530, 532, 534, 560, 570) at least some of which allow for the axial entrance and exit of fluid to and from the media. Accordingly, filter assembly 500 includes a first inlet 510 and a second outlet 516 and can be used in conjunction with an electric pump similar to priming pump 220 shown in FIG. 14. As shown in FIG. 23, the first filter media 542 comprises pleated filter media and second filter media 552 comprises tetrahedral filter media. In other embodiments, the filter media may comprise fluted filter media or any other flow-through filter media arrangement.

The filter media used in the various filter assembly embodiments described above can comprise various types of filter media. The filter media may comprise pleated media, corrugated media, fluted media, tetrahedral media or other media configurations. FIGS. 24-30 describe at least one type of filter media that may be used with the filter assembly.

FIGS. 24-27 show filter media 20 having an upstream inlet 22 receiving incoming dirty fluid as shown at arrows 23, and having a downstream outlet 24 discharging clean filtered fluid as shown at arrows 25. The filter media is pleated along a plurality of bend lines 26. The bend lines extend axially along an axial direction 28 (shown in FIGS. 25-27) and include a first set of bend lines 30 extending from upstream inlet 22 towards downstream outlet 24, and a second set of bend lines 32 extending from downstream outlet 24 axially towards the upstream inlet 22. The filter media has a plurality of filter media wall segments 34 extending in serpentine manner between the bend lines. The wall segments extend axially and define axial flow channels 36 therebetween. The channels have a height 38 along a transverse direction 40, which transverse direction 40 is perpendicular to axial direction 28 (shown in FIG. 25). The channels have a lateral width 42 along a lateral direction 44, which is perpendicular to axial direction 28 and perpendicular to transverse direction 40. At least some of the noted bend lines taper in the noted transverse direction as they extend axially in the noted axial direction, to be described.

The wall segments include a first set of wall segments 46 (shown in FIGS. 25-26) alternately sealed to each other at upstream inlet 22, e.g., by adhesive 48 or the like, to define a first set of channels 50 having open upstream ends, and a second set of channels 52 interdigitated with the first set of channels and having closed upstream ends. The wall segments include a second set of wall segments 54 (shown in FIGS. 26-27) alternately sealed to each other at downstream outlet 24, e.g., by adhesive 56 or the like, to define a third set of channels 58 having closed downstream ends, and a fourth set of channels 60 (shown in FIG. 27) having open downstream ends. The first set of bend lines 30 includes a first subset of bend lines 62 defining the first set of channels 50, and a second subset of bend lines 64 defining the second set of channels 52. The second subset of bend lines 64 taper in transverse direction 40 as they extend from upstream inlet 22 axially towards downstream outlet 24 (shown in FIGS. 28-30). The second set of bend lines 32 includes a third subset of bend lines 66 defining the third set of channels 58, and a fourth subset of bend lines 68 defining the fourth set of channels 60. The fourth subset of bend lines 68 taper in the transverse direction 40 as they extend from downstream outlet 24 axially towards the upstream inlet 22 (shown in FIGS. 28-30). The second set of channels 52 have a decreasing transverse channel height 38 along transverse direction 40 as the second set of channels 52 extend axially along axial direction 28 towards downstream outlet 24. The tapering of the second subset of bend lines 64 in the transverse direction 40 provides the decreasing transverse channel height 38 of the second set of channels 52. The fourth set of channels 60 have a decreasing transverse channel height along transverse direction 40 as the fourth set of channels 60 extend axially along axial direction 28 towards the upstream inlet 22. The tapering of the fourth subset of bend lines 68 in the transverse direction 40 provides the decreasing transverse channel height 38 of the fourth set of channels 60.

Incoming dirty fluid 23 to be filtered flows along axial direction 28 into open channels 50 at upstream inlet 22 and passes laterally and/or transversely through the filter media wall segments of the pleated filter media and then flows axially along axial direction 28 as clean filtered fluid 25 through open channels 60 at downstream outlet 24. Second subset of bend lines 64 provides lateral cross-flow thereacross along lateral direction 44 between respective channels downstream of upstream inlet 22. Fourth subset of bend lines 68 provides lateral cross-flow thereacross along lateral direction 44 between respective channels upstream of downstream outlet 24. Second and fourth subsets of bend lines 64 and 68 have axially overlapping sections 70, and the noted lateral cross-flow is provided at least at axially overlapping sections 70.

The second subset of bend lines 64 taper to respective termination points 72 (shown in FIGS. 28-30) providing at such termination points the minimum transverse channel height 38 of the second set of channels 52. The fourth subset of bend lines 68 taper to respective termination points 74 providing at such termination points the minimum transverse channel height 38 of the fourth set of channels 60. Termination points 72 of second subset of bend lines 64 are axially downstream of termination points 74 of fourth subset of bend lines 68. This provides the noted axially overlapping sections 70. Termination points 72 of second subset of bend lines 64 are at downstream outlet 24 in one embodiment, and in other embodiments are axially upstream of downstream outlet 24. Termination points 74 of fourth subset of bend lines 68 are at upstream inlet 22 in one embodiment, and in other embodiments are axially downstream of upstream inlet 22.

First set of wall segments 46 alternately sealed to each other at adhesive 48 at upstream inlet 22 define a first set of tetrahedron channels 50 having open upstream ends, and a second set of tetrahedron channels 52 interdigitated with the first set of tetrahedron channels 50 and having closed upstream ends. Second set of wall segments 54 alternately sealed to each other at adhesive 56 at downstream outlet 24 define a third set of tetrahedron channels 58 having closed downstream ends, and a fourth set of tetrahedron channels 60 interdigitated with the third set of tetrahedron channels 58 and having open downstream ends. The first set of bend lines 30 includes the first subset of bend lines 62 defining the first set of tetrahedron channels 50, and the second subset of bend lines 64 defining the second set of tetrahedron channels 52. The second subset of bend lines 64 taper in the transverse direction 40 as they extend from upstream inlet 22 axially towards downstream outlet 24. The second set of bend lines 32 includes the third subset of bend lines 66 defining the third set of tetrahedron channels 58, and the fourth subset of bend lines 68 defining the fourth set of tetrahedron channels 60. The fourth subset of bend lines 68 taper in the transverse direction 40 as they extend from downstream outlet 24 axially towards the upstream inlet 22.

First and second sets of tetrahedron channels 50 and 52 (shown in FIGS. 26-30) face oppositely to third and fourth sets of tetrahedron channels 58 and 60. Each of the tetrahedron channels 50, 52, 58, 60 is elongated in the axial direction 28. Each of the tetrahedron channels has a cross-sectional area along a cross-sectional plane defined by the transverse and lateral directions 40 and 44. The cross-sectional areas of the first and second sets of tetrahedron channels 50 and 52 decrease as the first and second sets of tetrahedron channels 50 and 52 extend along axial direction 28 from upstream inlet 22 toward downstream outlet 24. The cross-sectional areas of third and fourth sets of tetrahedron channels 58 and 60 decrease as the third and fourth sets of tetrahedron channels 58 and 60 extend along axial direction 28 from downstream outlet toward upstream inlet 22. In one embodiment, bend lines 26 are bent at a sharp pointed angle, as shown at 80 (shown in FIG. 25). In other embodiments, the bend lines are rounded along a given radius, as shown in dashed line at 82 (shown in FIG. 25).

In some embodiments, any of the filter elements described herein may include a tapered filter media (e.g., a tapered tetrahedral filter media) that has an inlet having an inlet height, which is larger than an outlet height of an outlet thereof. Various embodiments of this and other tapered filter media are described in International Patent App. No. PCT/US2017/041549, filed Jul. 11, 2017 and entitled, "Filter Element with Tapered Perimeter," the entire disclosure of which is hereby incorporated by reference herein in its entirety. For example, in some embodiments, a tapered filter element may include a coiled cylindrical filter element having an inlet face and an outlet face. The filter element includes an inlet face that has a larger diameter than the outlet face. The filter element comprises filter media coiled around a central core. The filter media includes a plurality flow channels. In some arrangements, the flow channels of the filter media are alternately sealed at the inlet face and the outlet face. Air or any other fluid to be filtered flows into the inlet face, and filtered air exits the outlet face. The inlet flow channel height is greater than the outlet flow channel height, which results in the inlet face having an inlet diameter that is larger than the outlet diameter of the outlet face. Accordingly, the filter element has a side wall (e.g., the circumferential wall) that has a draft angle (i.e., the side wall is angled with respect to the inlet face and the outlet face at non-perpendicular angles resulting in a tapered shape of the filter element).

Expanding further, the tapered filter media may include a plurality of flow channels. Each of the flow channels is open and closed on opposite sides of the filter media as immediately adjacent flow channels. Each of the flow channels has an inlet height of an inlet that receives air to be filtered, and an outlet height of an outlet. In this context, the respective heights refer to a distance from the lowermost point of a cross-section of the flow channel (at the respective inlet or outlet) to the uppermost point in the same along an axis that is substantially perpendicular to a longitudinal length of the filter media in the general direction of the bend lines of the filter media. The inlet height is larger than the outlet height. Accordingly, when the filter media is coiled or layered, the resulting filter media block has a larger inlet face than outlet face. The height differential is formed by forming a deeper tetrahedral shape (or deeper corrugations in the media) toward the inlet edge of the filter media than the outlet edge of the filter media. The greater inlet height serves to reduce restriction and improve dust loading characteristics (i.e., filter capacity) in a similar manner to how a fanned pleat in a cylindrical filter element demonstrates increased performance than the same filter media arranged in a block or panel.

Figure 31:
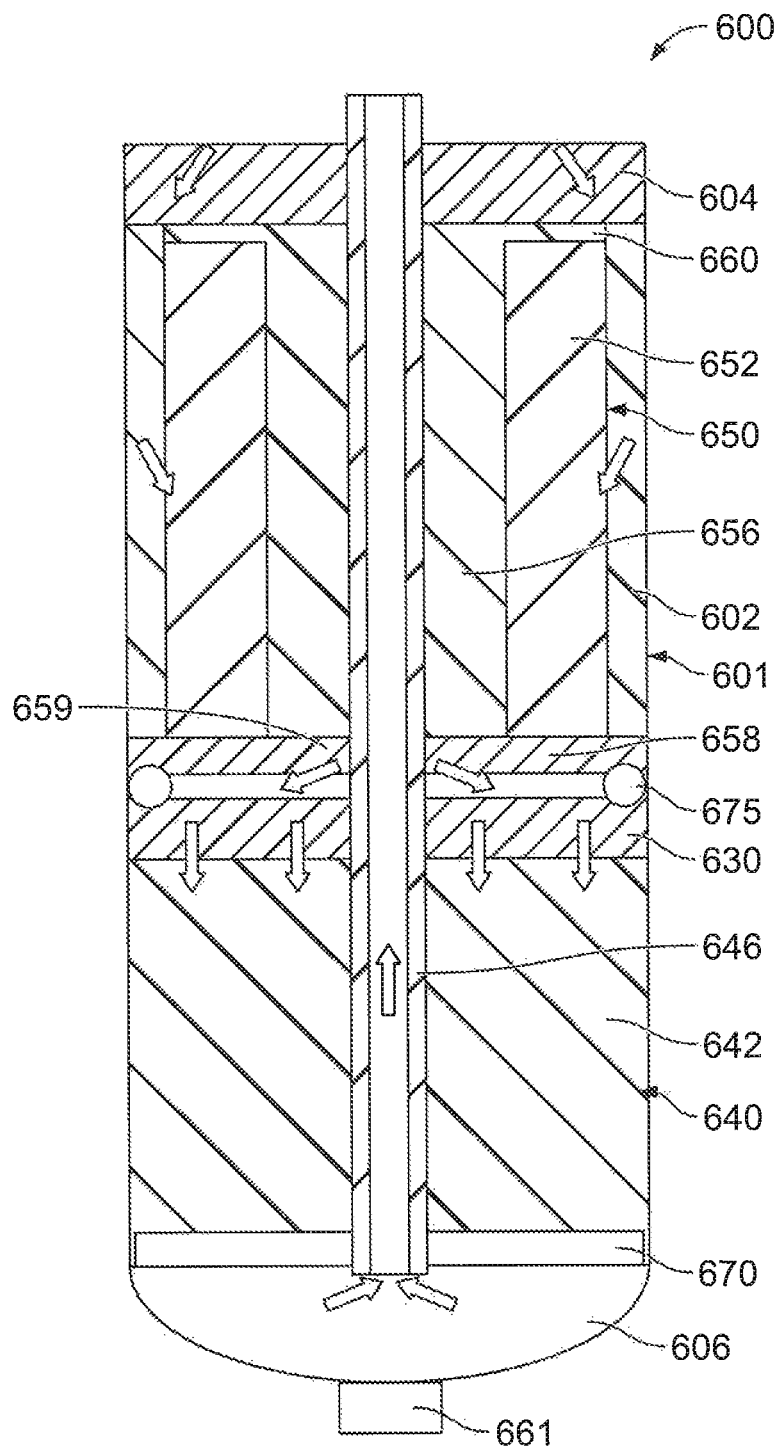
FIG. 31 is a schematic illustration of a filter assembly, according to an embodiment.

In some embodiments, a filter assembly may include a hybrid axially-stacked filter element such that one of the filter elements is structured to allow for axial fluid flow, and the other is structured to allow for radial fluid flow. For example, FIG. 31 is a schematic illustration of a filter assembly 600, according to an embodiment. The filter assembly 600 includes a filter housing 601, a first filter element 640, and a second filter element 650. The filter housing 601 includes a main housing portion 602, a cover 604 and a reservoir 606. The cover 604 is configured to be coupled to a filter head (not shown). The reservoir 606 is configured to collect water separated from a fluid flowing through the filter assembly 600, which may be drained via a drain 661 defined in the reservoir 606. For example, the first filter element 240 or the second filter element may also include a coalescing media similar to the coalescing media 144 for coalescing water which drops into the reservoir 606, from where it can be drained.

The first filter element 640 and the second filter element 650 are positioned within an internal cavity of the filter housing 601. The first filter element 640 includes an axial flow filter media 642 structured to allow axial flow of the fluid therethrough. In various embodiments, the axial flow filter media 642 may include a tetrahedral media, a fluted media or a straw media. A first element bottom endplate 670 is coupled to a first end of the axial flow filter media 642 proximate to the reservoir 606. A center tube 646 is positioned within the center of the axial flow filter media 642 and extends through and intermediate endplate 630 positioned between the first and second filter elements 640 and 650. The first and second filter elements 640, 650 are axially stacked and may be part of a single combined filter insert or separately assembled, as previously described herein.

The second filter element 650 comprises a radial flow filter media 652 (e.g., a pleated filter media) and is structured to allow radial fluid flow from outside the radial flow filter media 652 therethrough into a central channel 656 thereof. A second element top endplate 660 is coupled to a radial flow filter media first end proximate to the cover 604. A second element bottom endplate 658 is coupled to a radial flow filter media second end proximate to the intermediate endplate 630. An aperture 659 is defined in the second element bottom endplate 658 and is structured to allow radial fluid flow therethrough towards the first filter element 640. A sealing member 675 (e.g., a gasket, an O-ring or a lip seal) is positioned between the second element bottom endplate 658, the intermediate endplate 630 and the main housing portion 602 and is configured to prevent dirty fluid entering the second filter element 650 from flow therearound towards the first filter element 640.

The intermediate endplate 630 comprises a support structure which, in the embodiment shown in FIG. 31, is configured to cause the fluid flow to transition from a radial fluid flow to an axial fluid flow as the fluid flows from the first filter element 640 towards the second filter element 650. In such embodiments, the intermediate endplate 630 may include a grid or mesh (e.g., a metallic or plastic grid).

In operation, fluid flows enters the filter housing 601 such that it flows radially through the radial flow filter media 652 and then transitions into an axial fluid flow through the intermediate endplate 630. The fluid flow axially through the axial flow filter media 642 and then reverses direction in the reservoir and enters the center tube 646, from which the fluid is expelled from the filter housing 601.

Figure 32:
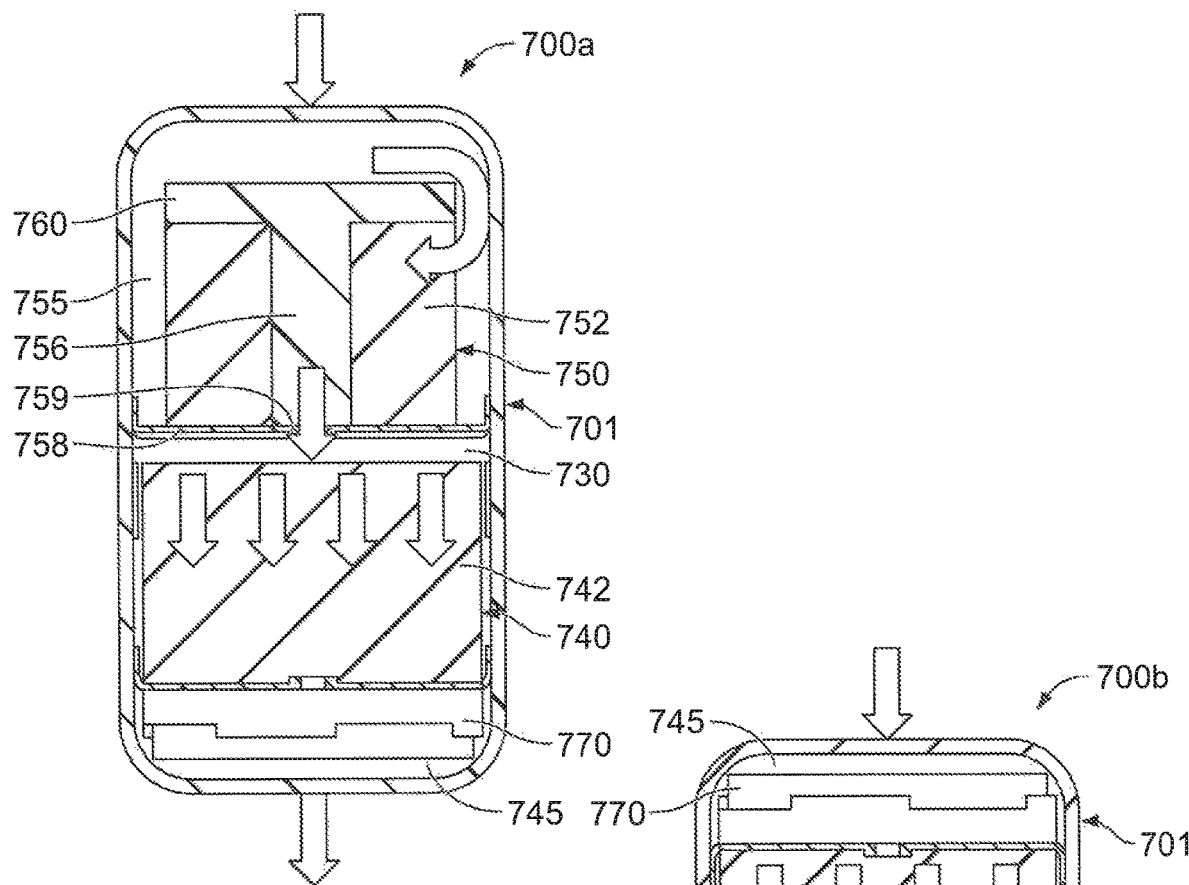
FIG. 32 is a schematic illustration of a filter assembly, according to another embodiment.

FIG. 32 is a schematic illustration of a filter assembly 700a, according to another embodiment. The filter assembly 700 includes a filter housing 701, a first filter element 740, a second filter element 750. Different from filter assembly 600, the filter assembly 700a does not include a drain for water. In some embodiments, the filter assembly 700a may include a fuel filter.

The first filter element 740 is positioned within a first filter chamber 745, and the second filter element 750 is positioned within a second filter chamber 755 that is separated from the first filter chamber 745 by an intermediate endplate 730. The first filter element 740 includes an axial flow filter media 742 (e.g., the axial flow filter media 642). A first element bottom endplate 770 is coupled to a first end of the axial flow filter media 642 proximate to a base of the housing 701. The first element bottom endplate 770 may include a grid or mesh to allow axial fluid flow to exit the axial flow filter media 742.

The second filter element 750 comprises a radial flow filter media 752 (e.g., the radial flow filter media 652) and is structured to allow radial fluid flow from outside the radial flow filter media 752 therethrough into central channel 756 defined therein. A second element top endplate 760 is coupled to a radial flow filter media first end proximate to a roof of the filter housing 701. A second element bottom endplate 758 is coupled to a radial flow filter media second end proximate to the intermediate endplate 730. An aperture 759 is defined in the second element bottom endplate 758 and is structured to allow radial fluid flow to flow therethrough towards the first filter element 740.

The intermediate endplate 730 may comprise a grid or mesh (e.g., a metallic or plastic grid) configured to transition fluid flow from radial fluid flow to axial fluid flow as the fluid flows from the second filter element 750 towards the first filter element 740. In operation, fluid flow enters the housing 701 such that it flows radially through the radial flow filter media 752 and then transitions into an axial fluid flow through the intermediate endplate 730. The axial fluid flow flows through the axial flow filter media 742 and then is expelled from the filter housing 701.

Figure 33:
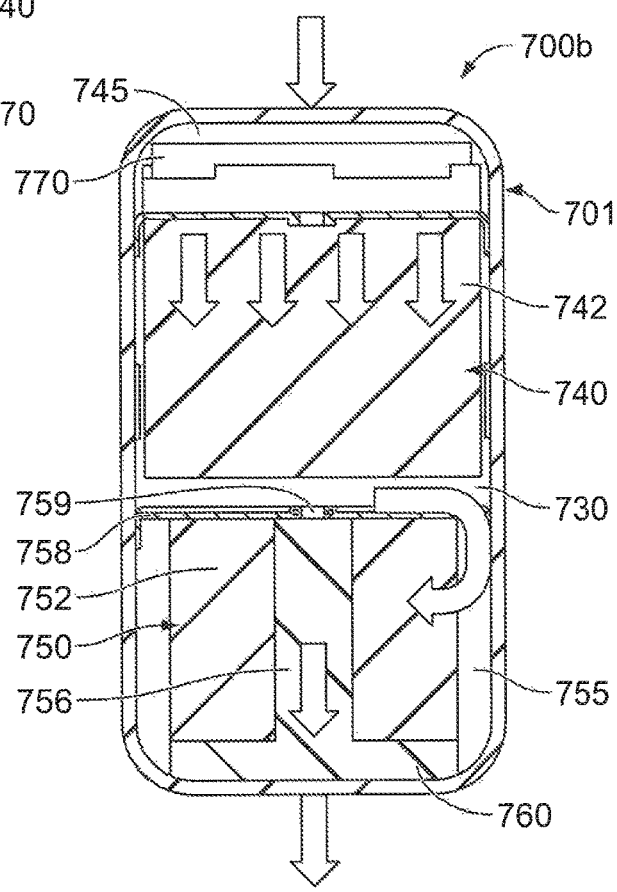
FIG. 33 is a schematic illustration of a filter assembly, according to yet another embodiment.

FIG. 33 is a schematic illustration of a filter assembly 700b, according to yet another embodiment. The filter assembly 700b is substantially similar to the filter assembly 700a, but different in that a direction of fluid flow through the filter assembly 700b is the opposite of the flow direction through the filter assembly 700a. As shown in FIG. 33, the fluid enters the first filter chamber 745 and flows through first filter element bottom endplate 770 (e.g., a grid or mesh) through the axial flow filter media 742 of the first filter element 740. The fluid then flows through the intermediate endplate 730 (e.g., a grid or mesh) and transitions into a radial fluid flow that enters the second filter chamber 755. The fluid flows radially through the radial flow filter media 752 of the second filter element 750, and then through the central channel 756 thereof and out of the filter housing 701.

Figure 34:
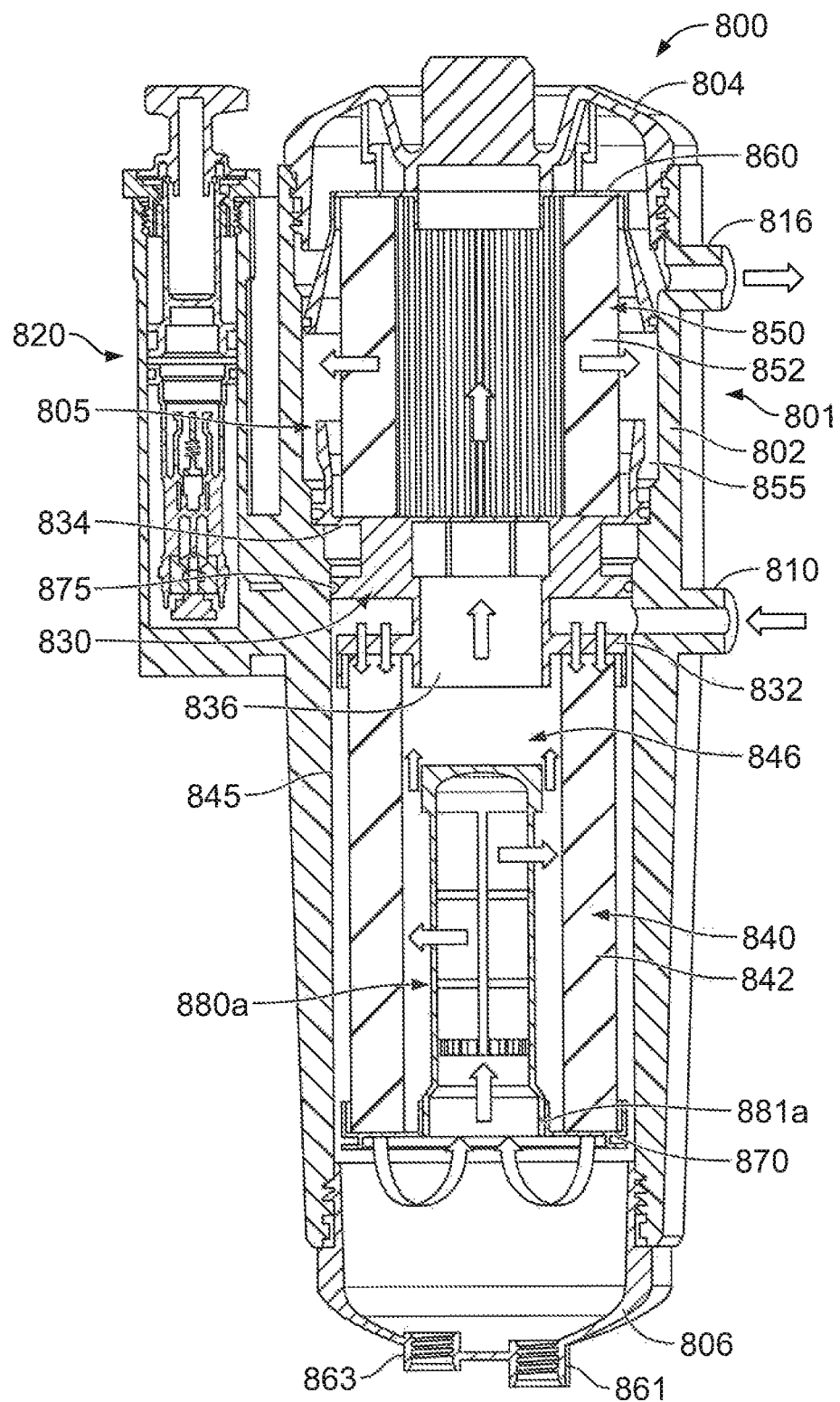
FIG. 34 is a side cross-section view of a filter assembly, according to an embodiment.

In some embodiments, a filter assembly including a stacked filter insert may be configured such that a fluid flows from an outward to an inward direction through a first filter element and from an inside to an outside direction through a second filter element included in the filter insert. For example, FIG. 34 is a side cross-section of a filter assembly 800, according to an embodiment. The filter assembly 800 includes a filter housing 801 having an internal cavity 805, a first filter element 840, and a second filter element 850 positioned within the internal cavity 805. The filter housing 801 includes a main housing portion 802, a cover 804, and a reservoir 806. The first and second filter elements 840 and 850 are axially stacked, and may form a single combined filter insert or are separately assembled, as previously described herein.

The first filter element 840 includes first filter media 842 which is an axial flow filter media (e.g., a tetrahedral, fluted or straw filter media) and is configured to filter a fluid. The second filter element 850 includes second filter media 852 which is a radial flow filter media (e.g., a pleated filter media) and is configured to further filter the fluid. The first filter element 840 can also include a coalescing media (e.g., the coalescing media 144, 244). Thus, separated water coalesces and drops into the reservoir 806, which includes a drain outlet 861 for removing separated water from the filter assembly 800. The reservoir 806 also includes a sensor port 863 through which a water-level sensor may be inserted. The water-level sensor may be configured to measure, a level of water in the reservoir 806, a rate of increase of water in the reservoir 806, etc. and alert a user when it is time to drain the water from the reservoir 806 (e.g., when the water level exceeds a predetermined level threshold). The filter assembly 800 also includes a priming pump 820 (e.g., the priming pump 220).

A center tube 846 is positioned within the center of the first filter media 842. The center tube 846 is configured to support the first filter media 842 and to allow fluid flow through the first filter media 842. A water separating structure 880a is positioned within the center tube 846. The water separating structure 880a may include a hydrophobic screen and/or a variable flow tube configured to promote water coalescing. As shown in FIG. 34, the water separating structure 880a is coupled at a first end 881a thereof (e.g., a wider end thereof) to the first element bottom endplate 870. In such embodiments, the center tube 846 may include a solid center tube which does not include any perforations.

The first filter media 842 is positioned between a first element top endplate 832 which is defined by a portion of an intermediate endplate 830, and the first element bottom endplate 870. The second filter media 852 is positioned between a second element top endplate 860 and a second element bottom endplate 834, which is defined by a second portion of the intermediate endplate 830. Thus, the first element top endplate 832 and the second element bottom endplate 834 form the single intermediate endplate 830 positioned between the first and second filter elements 840, 850. The intermediate endplate 830 also includes a conduit 836 structured to allow fluid flow between the first and second filter elements 840, 850.

The intermediate endplate 830 includes a sealing members 875 (e.g., a gasket, an O-ring or a lip seal) configured to seal against an inner wall of the filter housing 801. Accordingly, the sealing member 875 positioned on the intermediate endplate 830 divides the internal cavity 805 into a first filter chamber 845 including the first filter element 840 and a second filter chamber 855 including the second filter element 850.

As shown in FIG. 34, fluid to be filtered by the filter assembly 800 is first introduced to the first filter element 840 for filtering, and then to the second filter element 850. The filter housing 801 includes a first inlet 810 structured to supply fluid to be filtered to the first filter chamber 845 below the sealing member 875. The fluid flows axially through the first element top endplate 832 (e.g., a grid or mesh) first filter media 842 and enters the water separating structure 880a after reversing flow direction in the reservoir 806. The fluid then flows axially upwards into a central channel of the second filter media 852 through the conduit 836, and then radially outwards through the second filter media 852 into the second filter chamber 855. The filtered fluid then exits the filter housing 801 via an outlet 816.

Figure 35:
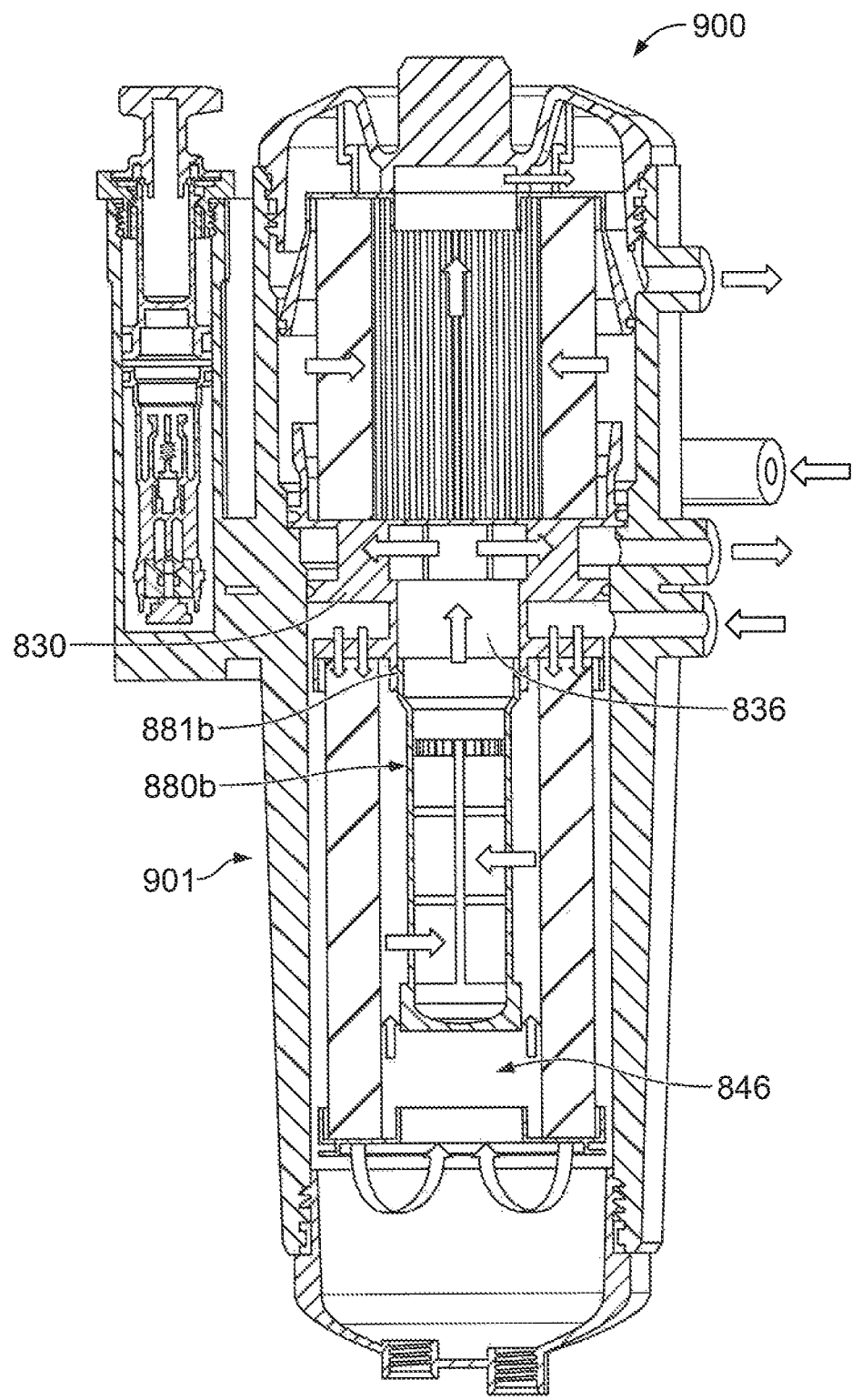
FIG. 35 is a side cross-section view of a filter assembly, according to another embodiment.

FIG. 35 is a side cross-section view of a filter assembly 900, according to another embodiment. The filter assembly 900 is substantially similar to the filter assembly 800 and includes similar components. However, different from the filter assembly 800, the filter assembly 800 includes a filter housing 901 which is substantially similar to the filter housing 301 described with respect to the filter assembly 300. Furthermore, the filter assembly 900 includes a water separating structure 880b (e.g., a hydrophobic screen or variable flow tube) having a first end 881b thereof (e.g., a wider end thereof) coupled to the conduit 836 defined by the intermediate endplate 830. In such embodiments, the center tube 846 may be solid or perforated.

In some embodiments, a filter assembly may include a water communication feature structured to facilitate communication of coalesced water from the filter media to a reservoir of the filter assembly. For example, FIG. 36 is a side cross-section view of a portion of a filter assembly 1000, according to another embodiment. The filter assembly 1000 is substantially similar to the filter assembly 800, but also includes a cup 1090 positioned about an outer periphery of the first end 881a of the water separating structure 880a. Water coalesces on inner sidewalls of the water separating structure 880a as the fluid flows therethrough into a central channel of the first filter element 840. The coalesced water then flows down along the inner sidewalls under the influence of gravity onto a base 1091 of the cup 1090. A funnel 1092 is coupled to the base 1091 of the cup 1090 and structured to allow water collected on the base 1091 to flow into the reservoir 806. In this manner, the cup 1090 and the funnel 1092 facilitate transport of water away from the water separating structure 880a, and directing the water towards the reservoir 806, thus preventing the water from becoming entrained or emulsified with the fluid (e.g., fuel) being filtered.

FIG. 37 is a side cross-section view of a portion of a filter assembly 1100, according to another embodiment. The filter assembly 1100 is substantially similar to the filter assembly 900, but also includes a cup 1190 position about an outer periphery of a second end 883b (e.g., a narrower end) of the water separating structure 880b opposite the first end 881b. Water coalesces on outer sidewalls of the water separating structure 880b as the fluid flows therethrough towards a second filter element (e.g., the second filter element 850), and then flows along the outer sidewalls under the influence of gravity onto a base 1191 of the cup 1190. A funnel 1192 is coupled to the base 1191 of the cup 1190 and structured to allow water collected on the base 1191 to flow into the reservoir 806.

Figure 38:
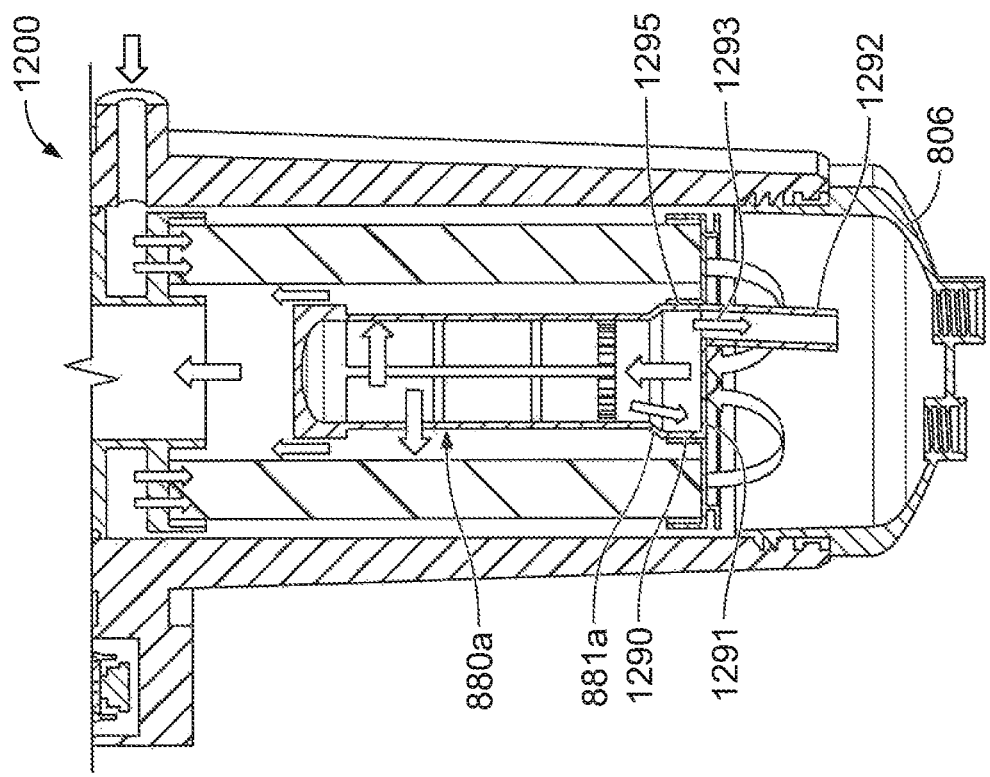
FIG. 38 is a side cross-section view of a portion of a filter assembly, according to yet another embodiment.

FIG. 38 is a side cross-section view of a portion of a filter assembly 1200, according to yet another embodiment. The filter assembly 1200 is substantially similar to the filter assembly 800, but also includes a cup 1290 that includes a base 1291. A first circumferential sidewall 1293 projects from the base 1291 towards the water separating structure 880a and is positioned within an inner periphery of the first end 881a of the water separating structure 880a. The first circumferential sidewall 1293 may have a cross-section corresponding to an inner cross-section of the first end 881a such that the first circumferential sidewall 1293 may form a seal with an inner surface of the first end 881a of the water separating structure 880a.

Furthermore, a second circumferential sidewall 1295 also extends from the base 1291 towards the water separating structure 880a. The second circumferential sidewall 1295 is located radially outwards from the first circumferential sidewall 1293 such that the second circumferential sidewall 1295 is positioned about an outer periphery of the first end 881a of the water separating structure 880a. The second circumferential sidewall 1295 may have a cross-section which is larger than an outer cross-section of the first end 881*a* such that a space is formed between the first end 881*a* of the water separating structure 880*a* and the second circumferential sidewall 1295. Water coalesced on an outer surface of the water separating structure 880*a* flows into the space and onto the base 1291 of the cup 1290. A funnel 1292 is coupled to the base 1291 of the cup 1290, with the funnel 1292 structured to allow water collected on the base 1291 to flow into the reservoir 806.

Figure 39:
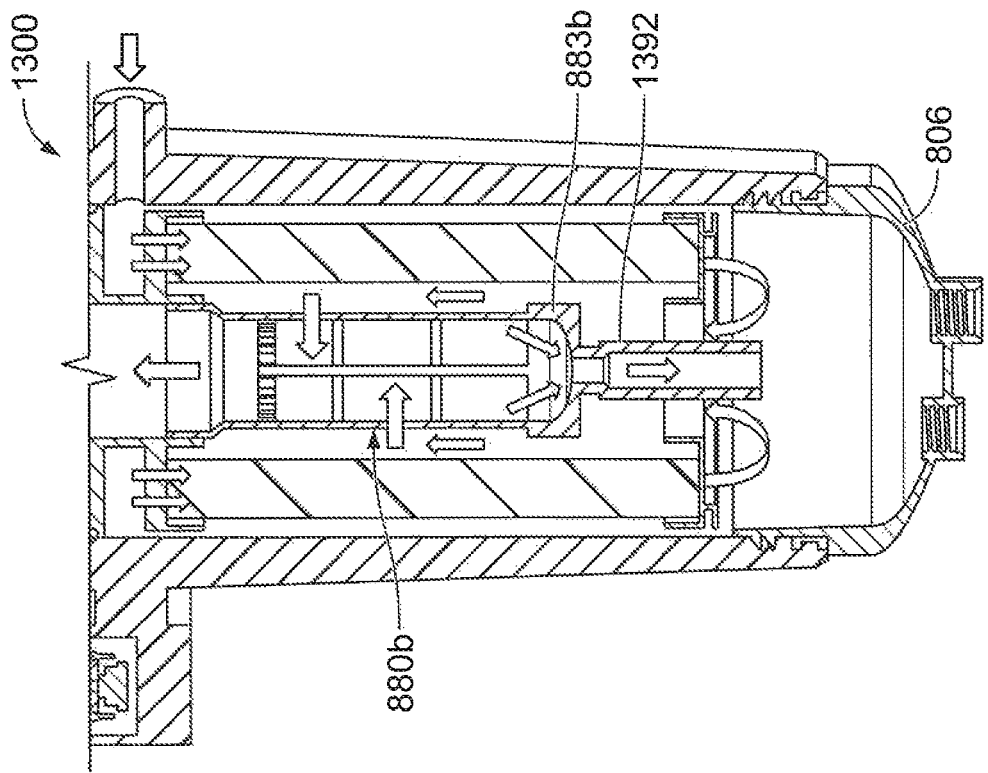
FIG. 39 is a side cross-section view of a portion of a filter assembly, according to still another embodiment.

FIG. 39 is a side cross-section view of a filter assembly 1100, according to still another embodiment. The filter assembly 1300 is substantially similar to the filter assembly 900, but also includes a funnel 1392 coupled to the second end 883*b* of the water separating structure 880*b*. Water coalesced on inner surfaces of the water separating structure 880*b* flows towards the funnel 1392 and is then is directed by the funnel 1392 into the reservoir 806.

Figure 40:
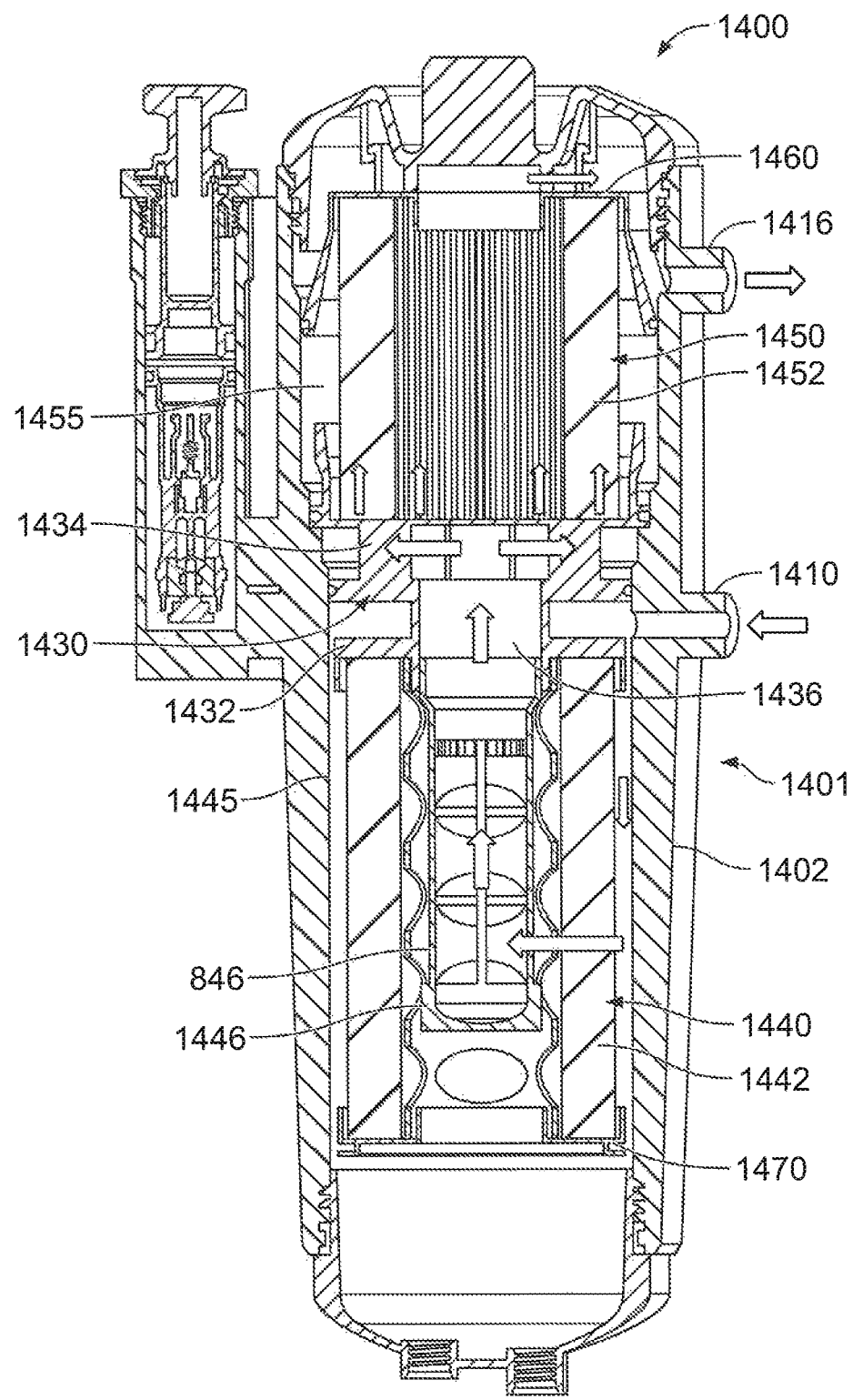
FIG. 40 is a side cross-section view of a filter assembly, according to yet another embodiment.

In some embodiments, a filter assembly including a stacked filter insert may be configured such that a fluid flows through a first axial flow filter element and then a second axial flow filter element included in a filter insert. For example, FIG. 40 is a side cross-section of a filter assembly 1400, according to an embodiment. The filter assembly 1400 includes a filter housing 1401 including a main housing portion 1402, a first filter element 1440, and a second filter element 1450 disposed within an internal cavity defined by the main housing portion 1402. The first and second filter elements 1440 and 1450 are axially stacked, and may form a single combined filter insert or are separately assembled, as previously described herein.

The filter assembly 1400 is substantially similar to the filter assembly 800, except for the following differences. The first filter element 1440 includes first filter media 1442 (e.g., a pleated filter media) which is a radial flow filter media, and the second filter element 1450 includes second filter media 1452 which is an axial flow filter media (e.g., a pleated filter media) and is configured to further filter the fluid. The first filter element 1440 can also include a coalescing media (e.g., the coalescing media 144, 244).

The center tube 846 is positioned within the center of the first filter media 842 and may include water separating structures or other features as previously described herein. An intermediate end plate 1430 is positioned between the first filter element 1440 and the second filter element 1450, and may be substantially similar to the intermediate end plate 830, as previously described herein. The intermediate end plate 1430 divides the main housing portion 1402 internal volume into a first filter chamber 1445 within which the first filter element 1440 is positioned, and a second filter chamber 1455 within which the second filter element 1450 is positioned. The first filter media 1442 is positioned between a first element top endplate 1432 which is defined by a portion of the intermediate endplate 1430, and the first element bottom endplate 1470. The second filter media 1452 is positioned between a second element top endplate 1460 and a second element bottom endplate 1434, which is defined by a second portion of the intermediate endplate 1430. Thus, the first element top endplate 1432 and the second element bottom endplate 1434 form the single intermediate endplate 1430 positioned between the first and second filter elements 1440, 1450. The intermediate endplate 1430 also includes a conduit 1436 structured to allow fluid flow between the first and second filter elements 1440, 1450.

As shown in FIG. 40, fluid to be filtered by the filter assembly 1400 is first introduced to the first filter element 1440 for filtering, and then to the second filter element 1450. The filter housing 1401 includes a first inlet 1410 structured to supply fluid to be filtered to the first filter chamber 1445. The fluid flows radially through the first filter media 1442 into the center tube 846 and is the communicated through the conduit 1436 defined in the intermediate end plate 1430 and through the second element bottom endplate 1434 (e.g., a grid or mesh) and axially through the second filter media 1452. An outlet 1416 is defined in the second filter chamber 1455 and the filtered fluid exits the housing 1401 therethrough.

Figure 41:
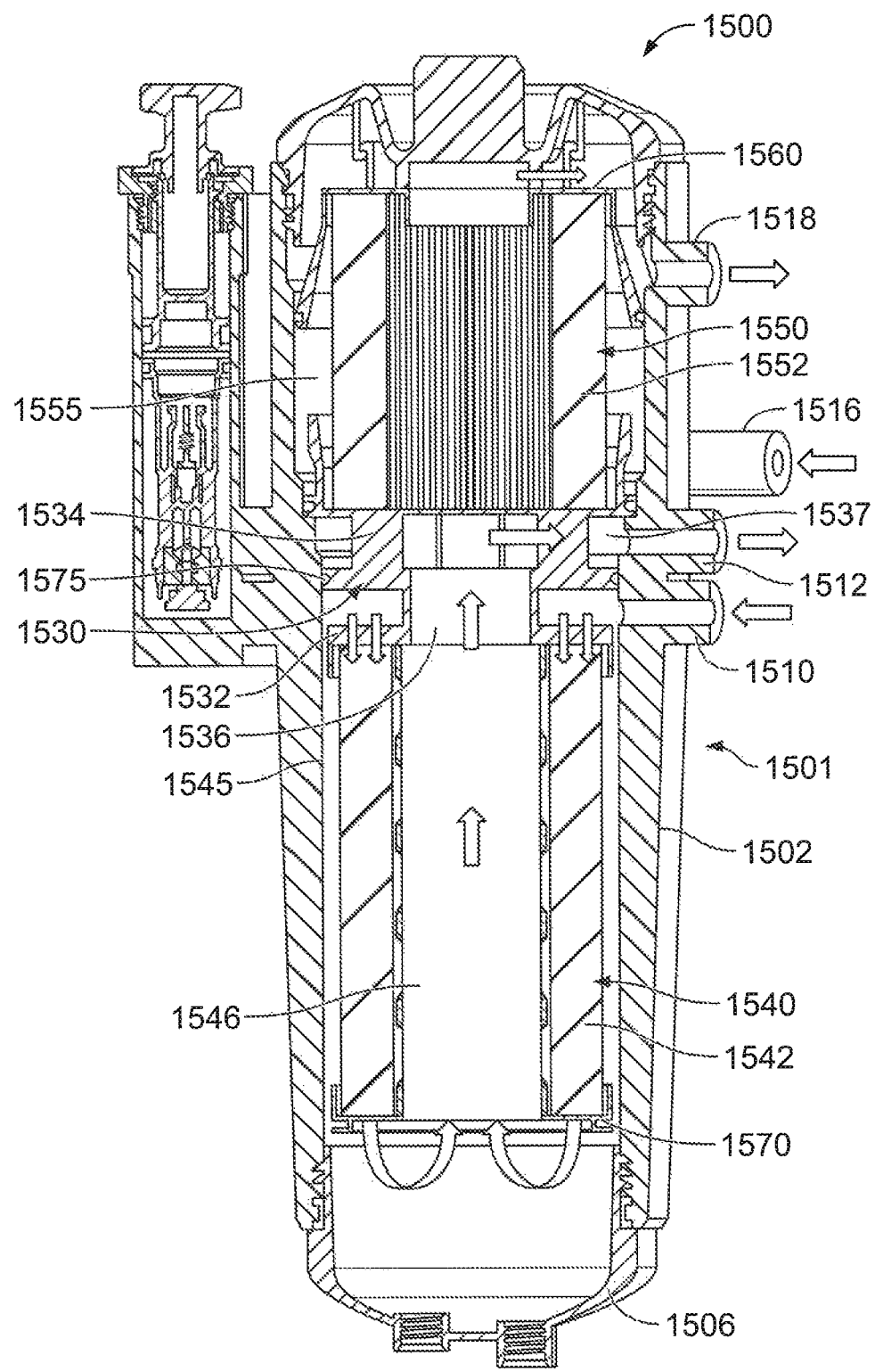
FIG. 41 is a side cross-section view of a portion of a filter assembly, according to still another embodiment.

For example, FIG. 41 is a side cross-section of a filter assembly 1500, according to another embodiment. The filter assembly 1500 includes a filter housing 1501 including a main housing portion 1502, a first filter element 1540, and a second filter element 1550 disposed within an internal cavity defined by the main housing portion 1502. The first and second filter elements 1540 and 1550 are axially stacked, and may form a single combined filter insert or are separately assembled, as previously described herein.

The filter assembly 1500 is substantially similar to the filter assembly 800, except for the following differences. The first filter element 1540 includes first filter media 1542 (e.g., a pleated filter media) which is an axial flow filter media, and the second filter element 1550 includes second filter media 1552 which is also an axial flow filter media (e.g., a pleated filter media).

A center tube 1546 is positioned within the center of the first filter media 1542 and may include water separating structures or other features as previously described herein. An intermediate end plate 1530 is positioned between the first filter element 1540 and the second filter element 1550. The intermediate end plate 1530 divides the main housing portion 1502 internal volume into a first filter chamber 1545 within which the first filter element 1440 is positioned, and a second filter chamber 1555 within which the second filter element 1550 is positioned. The first filter media 1542 is positioned between a first element top endplate 1532 which is defined by a portion of the intermediate endplate 1530, and the first element bottom endplate 1570. The second filter media 1552 is positioned between a second element top endplate 1560 and a second element bottom endplate 1534, which is defined by a second portion of the intermediate endplate 1530. Thus, the first element top endplate 1532 and the second element bottom endplate 1534 form the single intermediate endplate 1530 positioned between the first and second filter elements 1540, 1550.

A sealing member 1575 (e.g., an O-ring, gasket or lip seal) is positioned around the intermediate end plate 1530 and fluidly isolates the first chamber filter chamber 1545 from an intermediate chamber 1537 defined between the intermediate end plate main body and the second element bottom end plate 1534. The second filter chamber 1555 is also fluidly isolated from the first filter chamber 1545 and intermediate chamber 1537. The intermediate endplate 1550 also defines a conduit 1536 therethrough structured to allow fluid flow between the center tube 1546 and the intermediate chamber 1537, but not the second filter chamber 1555. Thus the first and second filter elements 1540, 1550 may be used as independent filters for filtering the same or separate fluids (e.g., first filter element 1540 may be used as a suction side filter, and second filter element 1550 may be used as pressure side filter).

As shown in FIG. 41, a first fluid to be filtered by the filter assembly 1500 is first introduced to the first filter chamber 1545 via a first inlet 1512. After flowing axially through the first filter element 1540, the fluid reverses direction in the reservoir 1506 and flows through the center tube 1546 into the conduit 1536. The fluid then flows into the intermediate chamber 1537 and out of the housing 1501 through a first outlet coupled to the intermediate chamber 1537. A second fluid, which may be the same as the first fluid or different therefrom, enters the second filter chamber through a second inlet 1516 and flows through the second filter element 1550, and eventually out of the housing 1501 via a second outlet 1518 defined in the second filter chamber 1518.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

While this specification contains many specific implementation details, these should not be construed as limitations on the scope of any embodiment or of what may be claimed, but rather as descriptions of features specific to particular implementations of particular embodiments. For example, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A filter insert comprising:
   a first element bottom endplate;
   a second element top endplate;
   an intermediate endplate positioned between the second element top endplate and the first element bottom endplate;
   a first filter element comprising a first filter media positioned between the first element bottom endplate and the intermediate endplate, the first filter element in fluid receiving communication with a first inlet and fluid providing communication with a first outlet; and
   a second filter element comprising a second filter media positioned between the second element top endplate and the intermediate endplate, the second filter element in fluid receiving communication with a second inlet and fluid providing communication with a second outlet, wherein the first outlet is in fluid providing communication with the second inlet,
   wherein the first inlet is fluidly coupled to the second outlet via the first filter element and the second filter element.

2. The filter insert of claim 1, wherein the intermediate endplate comprises a first element top endplate integrally formed with a second element bottom endplate.

3. The filter insert of claim 1, wherein the intermediate endplate comprises a first port, the first port in fluid receiving communication with the second filter element and in fluid providing communication with the second outlet.

4. The filter insert of claim 2, wherein the first filter media is positioned between the first element top endplate and the first element bottom endplate; and
   wherein the second filter media is positioned between the second element top endplate and the second element bottom endplate.

5. The filter insert of claim 1, wherein fluid flows from the first inlet, radially through the first filter element and the second filter element, and to the second outlet.

6. A filter insert comprising:
   a first element bottom endplate;
   a second element top endplate;
   an intermediate endplate positioned between the second element top endplate and the first element bottom endplate, the intermediate endplate comprising a flange having a plurality of apertures fluidly coupling the first filter chamber and the second filter chamber;
   a first filter element housed within the first filter chamber and comprising a first filter media positioned between the first element bottom endplate and the intermediate endplate; and
   a second filter element housed within the second filter chamber and comprising a second filter media positioned between the second element top endplate and the intermediate endplate.

7. The filter insert of claim 6, wherein the intermediate endplate comprises a first element top endplate integrally formed with a second element bottom endplate.

8. The filter insert of claim 7, wherein the first filter media is positioned between the first element top endplate and the first element bottom endplate; and
wherein the second filter media is positioned between the second element top endplate and the second element bottom endplate.

9. The filter insert of claim 6, wherein the apertures extend through the flange in an axial direction.

10. The filter insert of claim 6, wherein the first filter element defines a center passageway, the center passageway in fluid receiving communication with the first filter media and in fluid providing communication with the apertures.

11. The filter insert of claim 1, wherein the first filter media and the second filter media each comprise cylindrical filter media.

12. The filter insert of claim 1, wherein the first filter media and the second filter media each comprise pleated media.

13. The filter insert of claim 1, wherein the first element bottom endplate comprises a first element bottom endplate port, the first element bottom endplate port in fluid providing communication with a center passageway defined in an interior of the first filter element.

14. The filter insert of claim 1, wherein the first filter element comprises a center tube positioned within a center of the first filter media.

15. The filter insert of claim 14, further comprising a water separating structure positioned within the center tube.

16. The filter insert of claim 6, wherein the first filter media and the second filter media each comprise pleated media.

17. The filter insert of claim 6, wherein the first filter element defines a first center passageway and the second filter element defines a second center passageway, the first center and the second center passageway divided by a dividing wall formed within the intermediate endplate.

18. The filter insert of claim 17, wherein the plurality of apertures extend perpendicular to the dividing wall of the intermediate endplate.

19. The filter insert of claim 6, wherein the first filter element comprises a center tube positioned within a center of the first filter media.

20. The filter insert of claim 6, wherein the intermediate endplate includes a sealing member configured to form a seal with an inner wall of a filter housing.

* * * * *